United States Patent
Tateishi et al.

(10) Patent No.: US 8,749,691 B2
(45) Date of Patent: Jun. 10, 2014

(54) PHOTOGRAPHING SYSTEM, PATTERN DETECTION SYSTEM, AND ELECTRONIC UNIT

(75) Inventors: Kazuya Tateishi, Tokyo (JP); Kazuya Katsuki, Tokyo (JP); Shinichi Hayashi, Gifu (JP); Yusuke Sakai, Kanagawa (JP); Shingo Tsurumi, Saitama (JP)

(73) Assignee: Sony Corporation (JP)

( * ) Notice: Subject to any disclaimer, the term of this patent is extended or adjusted under 35 U.S.C. 154(b) by 98 days.

(21) Appl. No.: 13/593,662

(22) Filed: Aug. 24, 2012

(65) Prior Publication Data

US 2013/0057718 A1 Mar. 7, 2013

(30) Foreign Application Priority Data

Sep. 1, 2011 (JP) ................................ 2011-191036

(51) Int. Cl.
*H04N 5/222* (2006.01)
*H04N 5/228* (2006.01)
*H04N 5/225* (2006.01)
*H04N 7/18* (2006.01)
*G06K 9/00* (2006.01)

(52) U.S. Cl.
USPC ... 348/333.13; 348/169; 348/155; 348/222.1; 382/118

(58) Field of Classification Search
CPC .......... H04N 5/23295; H04N 5/23241; H04N 5/23219; H04N 5/232; G02F 1/1523

USPC ................ 348/333.13, 152, 155, 169, 222.1; 382/118; 345/48

See application file for complete search history.

(56) References Cited

U.S. PATENT DOCUMENTS

| 2009/0315869 A1* | 12/2009 | Sugihara et al. .............. 345/204 |
| 2011/0316987 A1* | 12/2011 | Komoriya et al. .............. 348/51 |
| 2012/0056902 A1* | 3/2012 | Yoshino ........................ 345/660 |
| 2013/0057573 A1* | 3/2013 | Chakravarthula et al. .... 345/619 |

FOREIGN PATENT DOCUMENTS

JP 2006-208558 A 8/2006

* cited by examiner

*Primary Examiner* — Nhan T Tran
(74) *Attorney, Agent, or Firm* — Lerner, David, Littenberg, Krumholz & Mentlik, LLP

(57) ABSTRACT

A photographing system includes: a photographing section photographing a subject to acquire a frame image including a subject image; and a matching section repeats image search through pattern matching between a template image and a subject image while sequentially changing a size ratio of the template image to the subject image, and obtains one or more size ratios at which patterns match each other, in a certain order of image search, and holds a size ratio having a largest value among such obtained size ratios as a first size ratio, and thereafter performs image search in a manner that pattern matching is performed at a first frequency in a range of a size ratio equal to or larger than the first size ratio, and is performed at a frequency lower than the first frequency in a range of a size ratio smaller than the first size ratio.

15 Claims, 25 Drawing Sheets

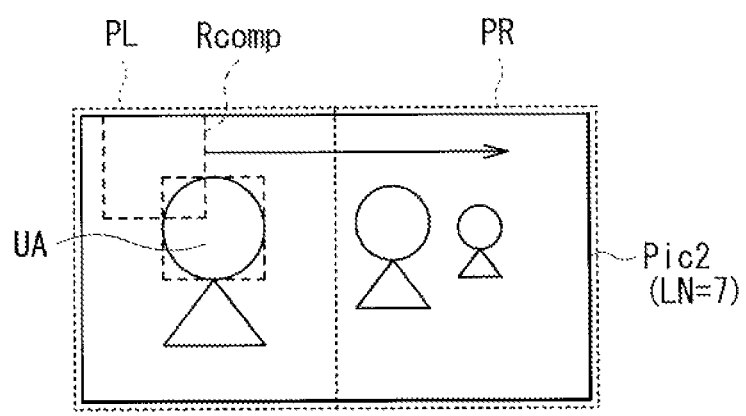
F I G. 25

PHOTOGRAPHING SYSTEM, PATTERN DETECTION SYSTEM, AND ELECTRONIC UNIT

CROSS-REFERENCE TO RELATED APPLICATION

The present application claims priority from Japanese Patent Application No. JP 2011-191036 filed in the Japanese Patent Office on Sep. 1, 2011, the entire content of which is incorporated herein by reference.

BACKGROUND

The present disclosure relates to a photographing system having a pattern detection function, a pattern detection system used for the photographing system, and an electronic unit including the photographing system.

Recently, a photographing system such as a camera has been mounted in various electronic units. An image pickup device configuring the photographing system has been progressively reduced in size as typified by a CMOS image sensor. Such a photographing system is used not only for a stationary electronic unit, but also for a portable electronic unit.

In the electronic units, the photographing system photographs an image that is used not only as a photograph but also for various applications. Examples of the applications include a system that recognizes a user face based on an image photographed by the photographing system. For example, Japanese Unexamined Patent Application Publication No. 2006-208558 discloses a camera that uses a result of face detection to reduce a photographing interval for continuous photographing.

SUMMARY

The face detection process detects a face from an image photographed by the photographing system through, for example, pattern detection. This may result in an increase in process time.

It is desirable to provide a photographing system, a pattern detection system, and an electronic unit, each of which allows process time to be reduced.

According to an embodiment of the present disclosure, there is provided a photographing system including: a photographing section photographing a subject to acquire a frame image including a subject image; and a matching section changing size of one or both of the subject image and a beforehand prepared template image to change a size ratio of the template image to the subject image, and performing pattern matching between the subject image and the template image, size of one or both of the subject image and the template image being changed, for each of size ratios. The matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and is performed at a frequency lower than the first frequency in a range of a size ratio smaller than the first size ratio.

According to an embodiment of the present disclosure, there is provided a pattern detection system including a matching section changing size of one or both of a frame image including a subject image and a beforehand prepared template image to change a size ratio of the template image to the subject image, and performing pattern matching between the subject image and the template image, size of one or both of the subject image and the template image being changed, for each of size ratios. The matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and is performed at a frequency lower than the first frequency in a range of a size ratio smaller than the first size ratio.

According to an embodiment of the present disclosure, there is provided an electronic unit including a photographing system and a control section performing operation control using the photographing system. The photographing system includes: a photographing section photographing a subject to acquire a frame image including a subject image; and a matching section changing size of one or both of the subject image and a beforehand prepared template image to change a size ratio of the template image to the subject image, and performing pattern matching between the subject image and the template image, size of one or both of the subject image and the template image being changed, for each of size ratios. The matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and performed at a frequency lower than the first frequency in a range of a size ratio smaller than the first size ratio. Examples of the electronic unit include a television apparatus, a digital camera, and a video camcorder.

In the photographing system, the pattern detection system, and the electronic unit according to the embodiments of the disclosure, image search is performed through pattern matching while a size ratio is sequentially changed. In that operation, a size ratio at which patterns match each other is obtained in a certain order of image search, and a size ratio having a largest value among such obtained size ratios is held as a first size ratio. Thereafter, the image search is performed such that pattern matching is performed at a first frequency in a range of a size ratio equal to or larger than the first size ratio, and performed at a frequency lower than the first frequency in a range of a size ratio smaller than the first size ratio.

According to the photographing system, the pattern detection system, and the electronic unit according to the embodiments of the disclosure, a first size ratio is obtained, and thereafter pattern matching is performed at a first frequency in a range of a size ratio equal to or larger than the first size ratio, and performed at a frequency lower than the first frequency in a range of a size ratio smaller than the first size ratio, thus achieving a reduction in process time.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 25 is another explanatory diagram illustrating the operation example of the face detection section illustrated in FIG. 21.

DETAILED DESCRIPTION OF EMBODIMENT

Hereinafter, embodiments of the present disclosure will be described in detail with reference to the accompanying drawings. It is to be noted that description is made in the following order.

1. First Embodiment
2. Second Embodiment

[1. First Embodiment]
[Configuration Example]
(Overall Configuration Example)

Figure 1:
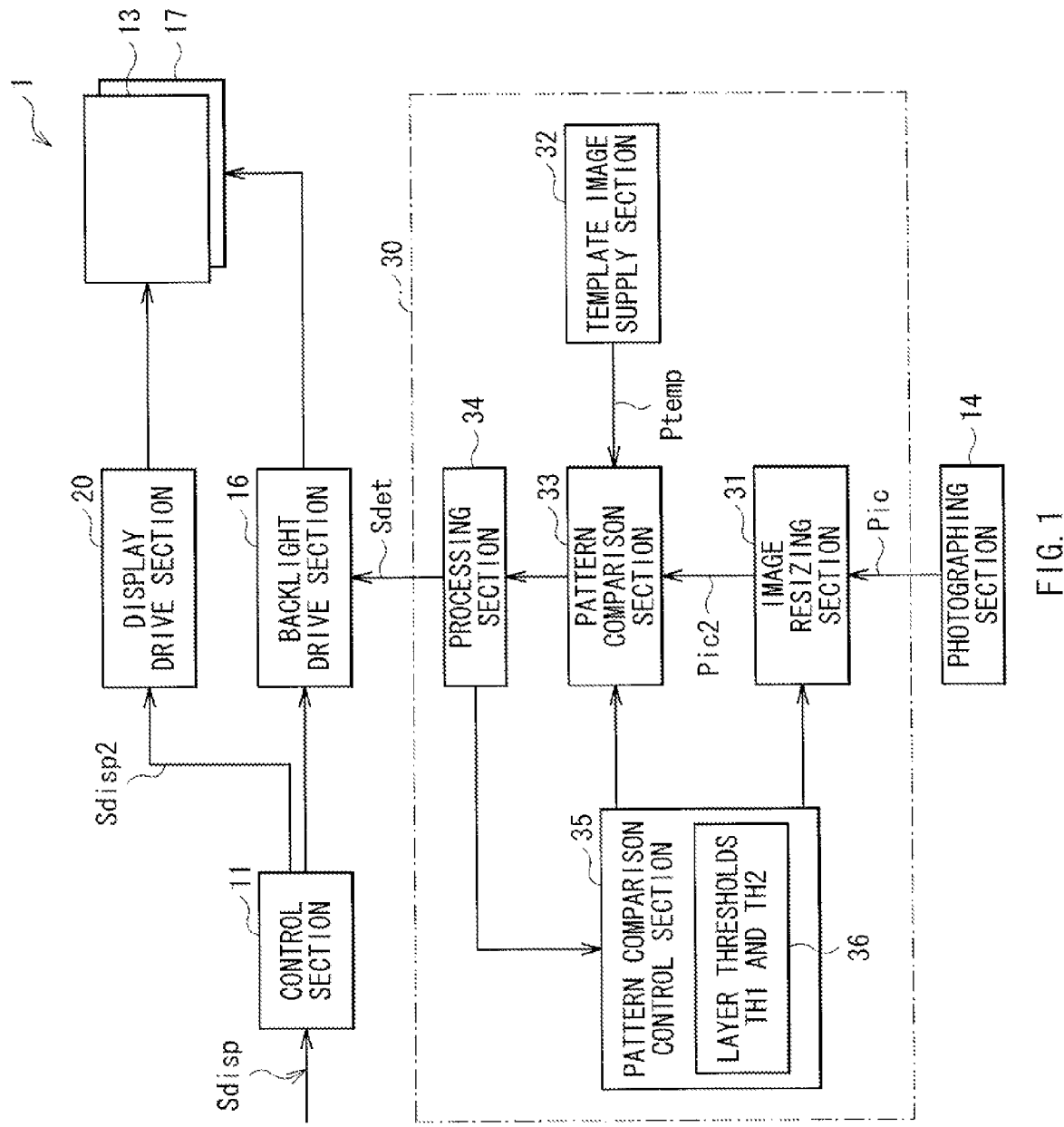
FIG. 1 is a block diagram illustrating an exemplary configuration of a display according to a first embodiment of the disclosure.

FIG. 1 illustrates an exemplary configuration of a display 1 according to a first embodiment. The display 1 detects a viewer viewing a screen, and controls a backlight based on the detection result. It is to be noted that a photographing system, a pattern detection system, and an electronic unit according to embodiments of the disclosure are embodied by the first embodiment, and therefore they are described together.

The display 1 includes a control section 11, a display drive section 20, a liquid crystal display section 13, a photographing section 14, a face detection section 30, a backlight drive section 16, and a backlight 17.

The control section 11 is configured of a circuit that controls the display drive section 20 and the backlight drive section 16 based on an image signal Sdisp. In detail, as described later, the control section 11 supplies an image signal Sdisp2 to the display drive section 20 to control the display drive section 20, and supplies a control signal to the backlight drive section 16 to control the backlight drive section 16.

The display drive section 20 drives the liquid crystal display section 13 based on the image signal Sdisp2 supplied from the control section 11. The liquid crystal display section 13 is configured of a liquid crystal display device, and displays an image through modulating light emitted from the backlight 17.

Figure 2:
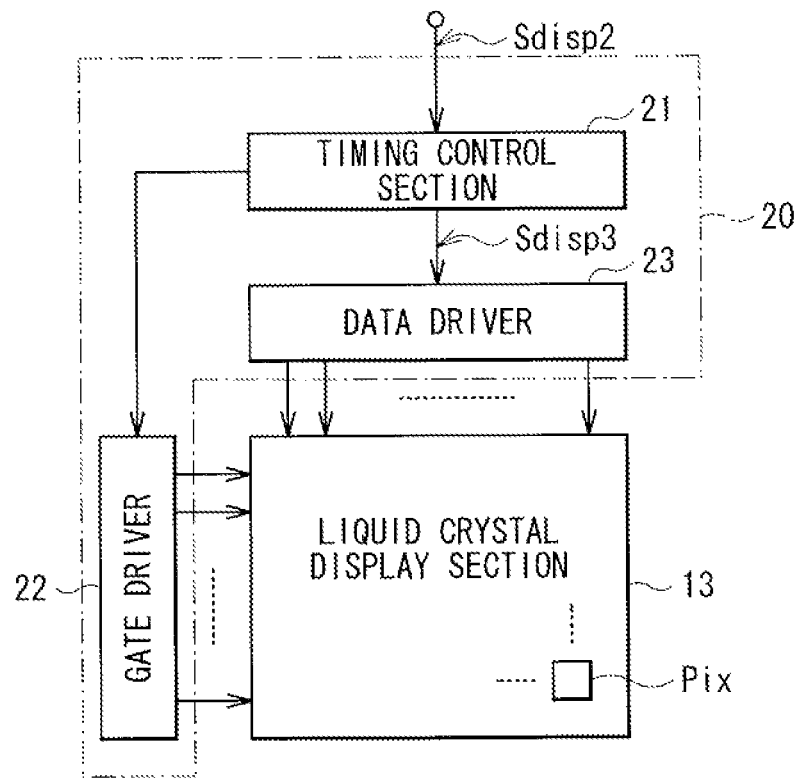
FIG. 2 is a block diagram illustrating an exemplary configuration of a display drive section illustrated in FIG. 1.

FIG. 2 illustrates an example of a block diagram including the display drive section 20 and the liquid crystal display section 13. The display drive section 20 includes a timing control section 21, a gate driver 22, and a data driver 23. The timing control section 21 controls drive timing of each of the gate driver 22 and the data driver 23, and generates an image signal Sdisp3 based on the image signal Sdisp2 supplied from the control section 11, and supplies the image signal Sdisp3 to the data driver 23. The gate driver 22 sequentially selects pixels Pix in the liquid crystal display section 13 according to timing control by the timing control section 21 for line sequential scan. The data driver 23 supplies a pixel signal based on the image signal Sdisp3 to each of the pixels Pix in the liquid crystal display section 13.

The liquid crystal display section 13 includes a liquid crystal material enclosed between two transparent substrates formed of, for example, glass. A transparent electrode formed of, for example, indium tin oxide (ITO) is provided on a surface of each of the transparent substrates, the surface facing the liquid crystal material, and configures the pixels Pix together with the liquid crystal material. The liquid crystal display section 13 includes the pixels Pix arranged in a matrix as illustrated in FIG. 2.

Figure 3:
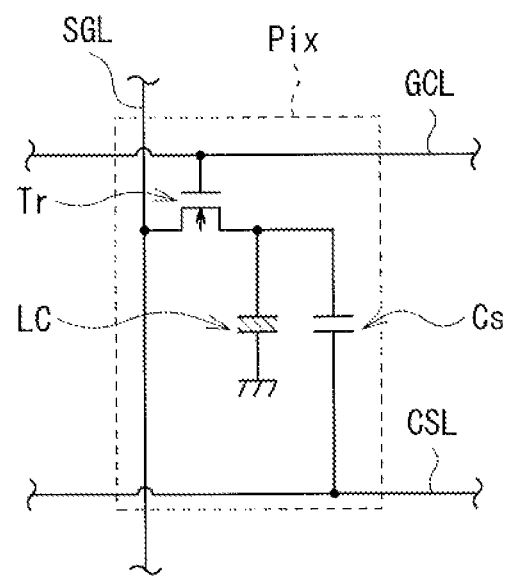
FIG. 3 is a circuit diagram illustrating an exemplary configuration of a liquid crystal display section illustrated in FIG. 1.

FIG. 3 illustrates an example of a circuit diagram of each pixel Pix. The pixel Pix includes a thin film transistor (TFT) device Tr, a liquid crystal device LC, and a holding capacitor Cs. The TFT device Tr is configured of, for example, a metal oxide semiconductor-field effect transistor (MOS-TFT), of which the gate is connected to a gate line GCL, the source is connected to a data line SGL, and the drain is connected to one end of the liquid crystal device LC and to one end of the holding capacitor Cs. One end of the liquid crystal device LC is connected to the drain of the TFT device Tr, and the other end thereof is grounded. One end of the holding capacitor Cs is connected to the drain of the TFT device Tr, and the other end thereof is connected to a holding capacitance line CSL. The gate line GCL is connected to the gate driver 22, and the data line SGL is connected to the data driver 23.

The photographing section 14 photographs a viewer viewing the screen of the display 1, and supplies a photographed image Pic to the face detection section 30. The photographing section 14 performs photographing, for example, ten times per second, and supplies such photographed images Pic to the face detection section 30. The face detection section 30 detects the face of the viewer based on the photographed images Pic. Specifically, the face detection section 30 checks whether or not a viewer viewing the screen of the display 1 exists. Then, the face detection section 30 supplies a face detection signal Sdet indicating information on whether or not such a viewer exists to the backlight drive section 16.

The backlight drive section 16 drives the backlight based on the control signal supplied from the control section 11 and the face detection signal Sdet supplied from the face detection section 30. In that operation, the backlight drive section 16 drives the backlight 17 based on the face detection signal Sdet such that if a viewer viewing the screen of the display 1 exists, the backlight 17 is turned on, and if such a viewer does not exist, the backlight 17 is turned off. In this way, the display 1 achieves a reduction in power consumption through controlling light emission of the backlight 17 depending on presence or absence of the viewer.

The backlight 17 emits light based on the drive signal supplied from the backlight drive section 16, and applies the light to the liquid crystal display section 13. For example, the backlight 17 is configured of a light emitting diode (LED). It is to be noted that the backlight 17 may be configured of, for example, a cold cathode fluorescent lamp (CCFL) without limitation.

(Photographing Section 14 and Face Detection Section 30)

The photographing section 14 and the face detection section 30 are now described in detail.

Figure 4A:
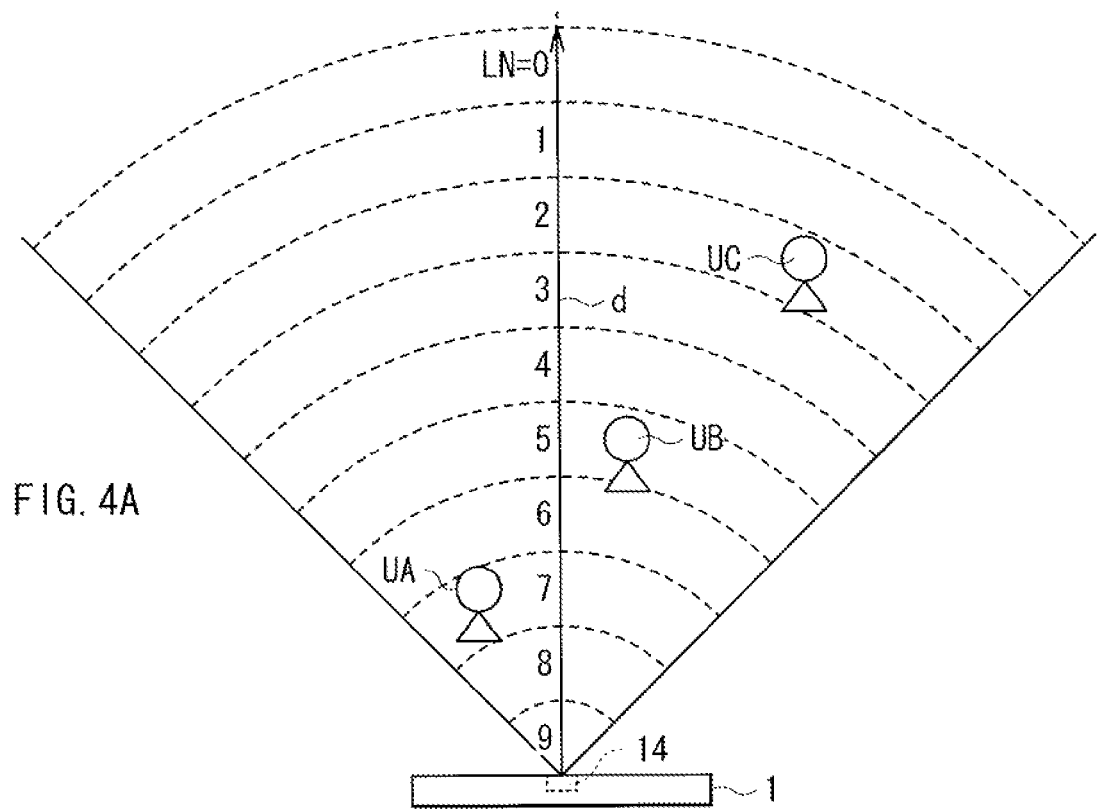
FIGS. 4A and 4B are explanatory diagrams illustrating an operation example of a photographing section illustrated in FIG. 1.
Figure 4B:
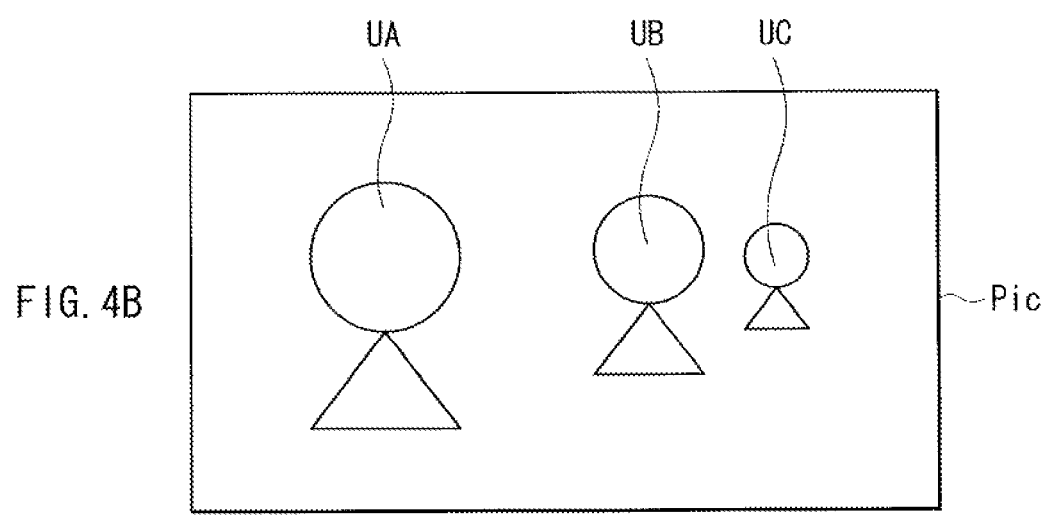

FIGS. 4A and 4B illustrate operation of the photographing section 14, where FIG. 4A illustrates an example of a position of each viewer viewing the display 1, and FIG. 4B illustrates an example of a photographed image Pic.

The example illustrated in FIG. 4A illustrates a case where three viewers UA, UB, and UC view the display 1. In detail, the viewer UA is at a position near the screen on the left side as viewed from the display 1, the viewer UB is at a position slightly distant from the screen slightly on the right side as viewed therefrom, and the viewer UC is at a position distant from the screen on the right side as viewed therefrom, each viewer viewing the screen of the display 1. A distance d from the display 1 is set in correspondence to a layer number LN (described later), as described later. The photographing section 14 photographs these viewers to acquire a photographed image Pic as illustrated in FIG. 4B. In the photographed image Pic, a viewer at a position nearer the display 1 is imaged larger. Specifically, in the photographed image Pic, the viewer UA viewing at a position nearest the display 1 is imaged largest, the viewer UB viewing at a position second-nearest the display 1 is imaged second-largest, and the viewer UC viewing at a position most distant from the display 1 is imaged smallest.

The face detection section 30 checks whether or not a viewer exists based on the photographed image Pic. In that operation, if the face detection section 30 detects the face of a viewer, the face detection section 30 obtains a distance d between the viewer and the display 1. As illustrated in FIG. 1, the face detection section 30 includes an image resizing section 31, a template image supply section 32, a pattern comparison section 33, a processing section 34, and a pattern comparison control section 35.

The image resizing section 31 reduces the size of the photographed image Pic supplied from the photographing section 14 based on an instruction from the pattern comparison control section 35, and thus resizes the photographed image Pic to form a photographed image Pic2. The template image supply section 32 supplies a template image Ptemp indicating a human face to the pattern comparison section 33. The pattern comparison section 33 detects a human face within the photographed image Pic2 through pattern comparison between the photographed image Pic2 supplied from the image resizing section 31 and the template image Ptemp supplied from the template image supply section 32.

Figure 5:
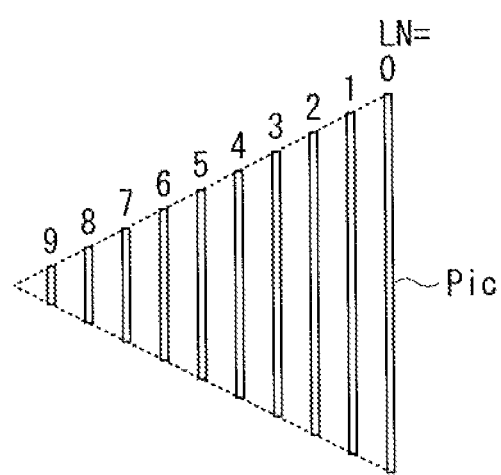
FIG. 5 is an explanatory diagram illustrating an operation example of an image resizing section illustrated in FIG. 1.

FIG. 5 illustrates a size reduction process of the photographed image Pic by the image resizing section 31. As illustrated in FIG. 5, the image resizing section 31 sequentially forms a plurality of (in this exemplary case, ten) photographed images Pic2 through size reduction of the photographed image Pic supplied from the photographing section 14. Each photographed image Pic2 is assigned a layer number LN (0 to 9) depending on corresponding rate R of size reduction. The rate R indicates a ratio of size of a photographed image Pic2 to size of a photographed image Pic. Specifically, in this exemplary case, the layer number LN of 0 corresponds to a rate R of 100%, and as the layer number LN increases, corresponding rate R decreases.

The image resizing section 31 reduces size of a photographed image Pic2 at a corresponding rate R based on information of the layer number LN supplied from the pattern comparison control section 35, as described later. In detail, if the image resizing section 31 receives an instruction to form an image corresponding to the layer number LN of 0, the image resizing section 31 outputs the photographed image Pic as the photographed image Pic2 without size reduction. If the image resizing section 31 receives an instruction to form images corresponding to layer numbers LN of 1 to 9, the image resizing section 31 reduces the size of a photographed image Pic at a rate R corresponding to each of the layer numbers LN, and outputs such size-reduced photographed images Pic as the photographed images Pic2.

In this exemplary case, the image resizing section 31 allows the rate R to vary in ten stages through setting the layer number LN in ten stages, 0 to 9. This, however, is not limitative. Alternatively, for example, the image resizing section 31 may set the layer number LN in nine stages or less or in eleven stages or more to allow the rate R to vary correspondingly.

Figure 6A:
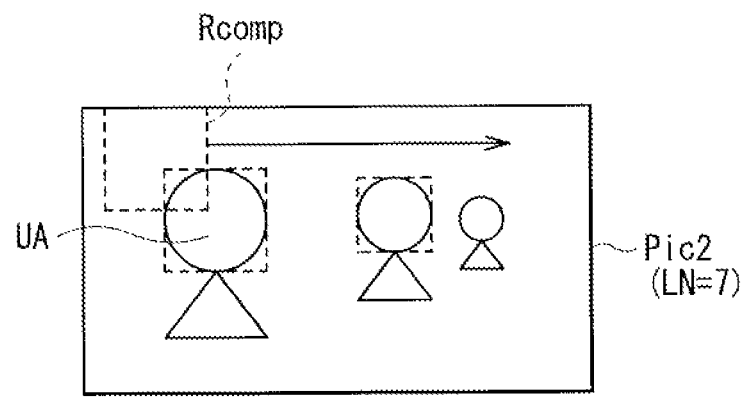
FIGS. 6A and 6B are explanatory diagrams illustrating an operation example of a pattern comparison section illustrated in FIG. 1.
Figure 6B:
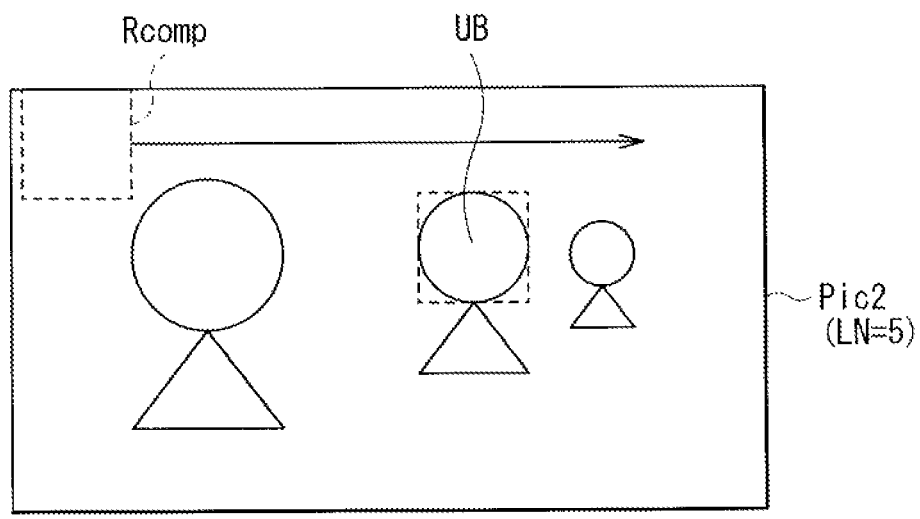

FIGS. 6A and 6B each illustrate an operation example of pattern comparison by the pattern comparison section 33, where FIG. 6A illustrates an operation example in the case of using a photographed image Pic2 formed through size reduction at a rate R corresponding to the layer number LN of 7, and FIG. 6B illustrates an operation example in the case of using a photographed image Pic2 formed through size reduction at a rate R corresponding to the layer number LN of 5.

The pattern comparison section 33 performs pattern comparison between a photographed image Pic2 and a template image Ptemp. In that operation, the pattern comparison section 33 checks whether or not a pattern similar to the template image Ptemp exists within the photographed image Pic2. In detail, as illustrated in FIGS. 6A and 6B, while the pattern comparison section 33 gradually shifts a region to be compared Rcomp having the same size as that of the template image Ptemp in horizontal and vertical directions within the photographed image Pic2 to scan the photographed image Pic2, the pattern comparison section 33 performs pattern comparison between a portion of the photographed image Pic2 in the region to be compared Rcomp and the template image Ptemp. In the case where the template image Ptemp is configured of, for example, 20 by 20 pixels, a shifting distance of the region to be compared Rcomp is set to a distance corresponding to two pixels, for example.

The image resizing section 31 forms the photographed images Pic2 through size reduction of the photographed image Pic at a rate R corresponding to each of the various layer numbers LN, and supplies the photographed images Pic2 to the pattern comparison section 33. The pattern comparison section 33 performs pattern comparison for a photographed image Pic2 corresponding to each layer number LN. For example, in this exemplary case, in the case where a photographed image Pic2 corresponding to a layer number LN of 7 is supplied, the pattern comparison section 33 detects the face of the viewer UA viewing the screen of the display 1 at a position near the display 1 through scanning the photographed image Pic2 as illustrated in FIG. 6A. In the case where a photographed image Pic2 corresponding to a layer number LN of 5 is supplied, the pattern comparison section 33 detects the face of the viewer UB viewing the screen of the display 1 at a position slightly distant from the display 1 through scanning the photographed image Pic2 as illustrated in FIG. 6B. In other words, the face detection section 30 detects viewers at various distances d from the display 1 through pattern comparison using the photographed images Pic2 corresponding to a plurality of layer numbers LN.

In this way, the face detection section 30 obtains a distance d from the display 1 to a viewer based on the layer number LN associated with the photographed image Pic2 in which the face of the viewer is detected. Specifically, the face detection section 30 detects the viewer UA at a distance d corresponding to the layer number LN of 7 from the display 1 and the viewer UB at a distance d corresponding to the layer number LN of 5 from the display 1. As illustrated in FIG. 4A, the layer number LN and the distance d are in a relationship where the distance d from the display 1 is smaller/larger with a larger/smaller layer number LN.

The pattern comparison section 33 supplies a result of face detection performed in this way to the processing section 34. In detail, the pattern comparison section 33 supplies information of the layer number LN corresponding to a photographed image Pic2 in which the face of a viewer is detected, the coordinates of the face, the number of detected faces, and the like to the processing section 34.

In FIG. 1, the processing section 34 determines whether or not a viewer viewing the display 1 exists, based on the result of face detection by the pattern comparison section 33, and informs presence or absence of the viewer of the backlight drive section 16. In addition, as described later, the processing section 34 has a function of obtaining a distance d from the display 1 to each detected viewer, and informing the layer number LN corresponding to a viewer at a smallest distance d from the display 1 as a layer threshold TH1 of the pattern comparison control section 35, and informing the layer number LN corresponding to a viewer at a largest distance d from the display 1 as a layer threshold TH2 of the pattern comparison control section 35.

The pattern comparison control section 35 controls each operation of the image resizing section 31 and the pattern comparison section 33. The pattern comparison control section 35 includes a memory 36. The memory 36 stores information of each of the layer thresholds TH1 and TH2 therein.

The pattern comparison control section 35 controls the image resizing section 31 and the pattern comparison section 33 to perform sequential face detection from a region near the display 1 to a region distant from that. In detail, the pattern comparison control section 35 instructs the image resizing section 31 to decrease the layer number LN in order from 9. The image resizing section 31 forms the photographed images Pic2 while sequentially increasing the rate R for size reduction of the photographed image Pic according to that instruction. Then, the pattern comparison control section 35 instructs the pattern comparison section 33 to perform pattern comparison for each of the photographed images Pic2 supplied from the image resizing section 31.

In that operation, the pattern comparison control section 35 controls the image resizing section 31 and the pattern comparison section 33 to perform face detection at a relatively high frequency across the blocks from the display 1 to a position of the viewer nearest the display 1, and at a relatively low frequency across the blocks behind the position. In detail, as described later, the pattern comparison control section 35 controls the image resizing section 31 and the pattern comparison section 33 to perform face detection at a high frequency (high-frequency detection M1) in the case of a layer number LN equal to or larger than the layer threshold TH1, at a middle frequency (middle-frequency detection M2) in the case of a layer number LN smaller than the layer threshold TH1 and equal to or larger than the layer threshold TH2, and at a low frequency (low-frequency detection M3) in the case of a layer number LN smaller than the layer threshold TH2.

According to such a configuration, the face detection section 30 searches a viewer viewing the display 1 through sequential face detection from a region near the display 1 to a region distant from that. In that operation, the face detection section 30 checks whether one or more viewers view the screen of the display 1 in a short process time through face detection at a frequency that varies depending on the distance d from the display 1.

The photographed image Pic corresponds to a specific example of "frame image" of the disclosure. The face detection section 30 corresponds to a specific example of "matching section" of the disclosure. The layer threshold TH1 corresponds to a specific example of "first size ratio" of the disclosure. The layer threshold TH2 corresponds to a specific example of "second size ratio" of the disclosure.

[Operation and Function]

The operation and the function of the display 1 according to the first embodiment are now described.

(Outline of Overall Operation)

First, an outline of overall operation of the display 1 is described with reference to FIG. 1. The control section 11 controls the display drive section 20 and the backlight drive section 16. The display drive section 20 drives the liquid crystal display section 13 based on the image signal Sdisp2 supplied from the control section 11. The liquid crystal display section 13 performs display through modulating light emitted from the backlight 17. The photographing section 14 photographs a viewer viewing the screen of the display 1. The face detection section 30 detects the face of the viewer based on a photographed image Pic photographed by the photographing section 14, and outputs presence or absence of a detected face as a face detection signal Sdet. In that operation, the face detection section 30 operates to perform face detection at a relatively high frequency across the blocks from the display 1 to a position of a viewer nearest the display 1, and at a relatively low frequency across the blocks behind the position. The backlight drive section 16 drives the backlight 17 based on the control signal supplied from the control section 11 and the face detection signal Sdet supplied from the face detection section 30. In that operation, the backlight drive section 16 drives the backlight 17 based on the face detection signal Sdet such that if a viewer viewing the screen of the display 1 exists, the backlight 17 is turned on, and if such a viewer does not exist, the backlight 17 is turned off. The backlight 17 emits light based on the drive signal supplied from the backlight drive section 16, and applies the light to the liquid crystal display section 13.

(Detailed Operation of Face Detection Section 30)

Operation of the face detection section 30 is now described. The face detection section 30 performs face detection at a relatively high frequency across the blocks from the display 1 to a position of a viewer nearest the display 1, and at a relatively low frequency across the blocks behind the position. Specifically, the face detection section 30 sequentially performs face detection from a region near the display 1 to a region distant from that while sequentially decreasing the layer number LN. In that operation, the face detection section 30 performs face detection at a high frequency (high-frequency detection M1) in the case of a layer number LN equal to or larger than the layer threshold TH1, at a middle frequency (middle-frequency detection M2) in the case of a layer number LN smaller than the layer threshold TH1 and equal to or larger than the layer threshold TH2, and at a low frequency (low-frequency detection M3) in the case of a layer number LN smaller than the layer threshold TH2. Such operation of the face detection section 30 is described in detail below with a specific example.

Figure 7:
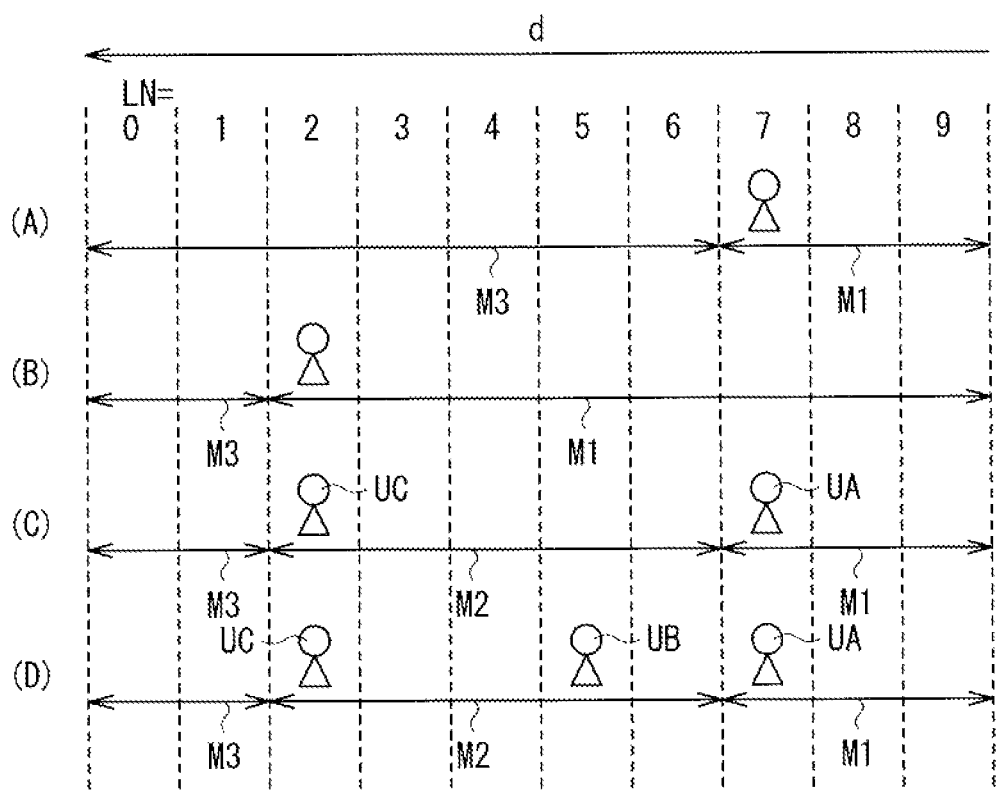
FIG. 7 is an explanatory diagram illustrating an operation example of a face detection section illustrated in FIG. 1.

FIG. 7 illustrates the face detection operation by the face detection section 30, where (A) and (B) each illustrate a case of one viewer (cases C1 and C2), (C) illustrates a case of two viewers (case C3), and (D) illustrates a case of three viewers (case C4). (A) of FIG. 7 illustrates a case where one viewer is at a position near the display 1 (case C1), and (B) thereof illustrates a case where one viewer is at a position distant from the display 1 (case C2). In FIG. 7, the horizontal axis indicates a distance d from the display 1. In other words, the display 1 is located at the right end of FIG. 7, and the distance d is larger at a position closer to the left end thereof.

In the case of one viewer (cases C1 and C2), as illustrated in (A) and (B) of FIG. 7, the face detection section 30 performs face detection through the high-frequency detection M1 across the blocks from the display 1 to the viewer, and performs face detection through the low-frequency detection M3 across the blocks more distant from the display than the viewer. In detail, as illustrated in (A) of FIG. 7, if a viewer is at a position corresponding to the layer number LN of 7 case C1), the face detection section 30 performs face detection through the high-frequency detection M1 across the blocks corresponding to the layer numbers LN of 9 to 7, and performs face detection through the low-frequency detection M3 across the blocks corresponding to the layer numbers LN of 6 to 0. In other words, in the case C1, since the viewer is at the position corresponding to the layer number LN of 7, both the layer threshold TH1 and the layer threshold TH2 are set to "7". Consequently, the face detection section 30 performs face detection through the high-frequency detection M1 across the blocks corresponding to the layer numbers LN of 9 to 7 which are each equal to or larger than the layer threshold TH1 (=7). In addition, the face detection section 30 performs face detection through the low-frequency detection M3 across the blocks corresponding to the layer numbers LN of 6 to 0 which are each smaller than the layer threshold TH2 (=7). It is to be noted that the middle-frequency detection M2 is not performed in this exemplary case since the layer thresholds TH1 and TH2 are equal to each other.

Similarly, if a viewer is at a position corresponding to the layer number LN of 2 (case C2), as illustrated in (B) of FIG. 7, the face detection section 30 performs face detection through the high-frequency detection M1 across the blocks corresponding to the layer numbers LN of 9 to 2, and performs face detection through the low-frequency detection M3 across the blocks corresponding to the layer numbers LN of 1 and 0. In other words, in the case C2, since the viewer is at the position corresponding to the layer number LN of 2, both the layer threshold TH1 and the layer threshold TH2 are set to "2". Consequently, the face detection section 30 performs face detection through the high-frequency detection M1 across the blocks corresponding to the layer numbers LN of 9 to 2 which are each equal to or larger than the layer threshold TH1 (=2). In addition, the face detection section 30 performs face detection through the low-frequency detection M3 across the blocks corresponding to the layer numbers LN of 1 and 0 which are each smaller than the layer threshold TH2 (=2). It is to be noted that the middle-frequency detection M2 is not performed in this exemplary case since the layer thresholds TH1 and TH2 are equal to each other.

In the case of two viewers (case C3), as illustrated in (C) of FIG. 7, the face detection section 30 performs face detection through the high-frequency detection M1 across the blocks from the display 1 to a first viewer near the display 1, performs face detection through the middle-frequency detection M2 across the blocks from the first viewer to a second viewer distant from the display 1, and performs face detection through the low-frequency detection M3 across the blocks more distant from the display 1 than the second viewer. In detail, as illustrated in (C) of FIG. 7, if a viewer UA is at a position corresponding to the layer number LN of 7, and if a viewer UC is at a position corresponding to the layer number LN of 2, the face detection section 30 performs face detection through the high-frequency detection M1 across the blocks corresponding to the layer numbers LN of 9 to 7, performs face detection through the middle-frequency detection M2 across the blocks corresponding to the layer numbers LN of 6 to 2, and performs face detection through the low-frequency detection M3 across the blocks corresponding to the layer numbers LN of 1 and 0. In other words, in the case C3, since the viewer UA is at the position corresponding to the layer number LN of 7, and the viewer UC is at the position corresponding to the layer number LN of 2, the layer threshold TH1 is set to "7", and the layer threshold TH2 is set to "2". Consequently, the face detection section 30 performs face detection through the high-frequency detection M1 across the blocks corresponding to the layer numbers LN of 9 to 7 which are each equal to or larger than the layer threshold TH1 (=7). In addition, the face detection section 30 performs face detection through the middle-frequency detection M2 across the blocks corresponding to the layer numbers LN of 6 to 2 which are each smaller than the layer threshold TH1 (=7) and equal to or larger than the layer threshold TH2 (=2). In addition, the face detection section 30 performs face detection through the low-frequency detection M3 across the blocks corresponding to the layer numbers LN of 1 and 0 which are each smaller than the layer threshold TH2 (=2).

In the case of three viewers (case C4), as illustrated in (D) of FIG. 7, the face detection section 30 performs face detection through the high-frequency detection M1 across the blocks from the display 1 to a first viewer nearest the display 1, performs face detection through the middle-frequency detection M2 across the blocks from the first viewer to a third viewer most distant from the display, and performs face detection through the low-frequency detection M3 across the blocks more distant from the display than the third viewer. In other words, the detection frequency varies only between the front and the back of a viewer nearest the display 1 and between the front and the back of a viewer most distant from the display 1, as in the case of two viewers (case C3).

In the case of four or more viewers, the face detection section 30 operates in the same way as in the case of three viewers (case C4). Specifically, the face detection section 30 performs face detection through the high-frequency detection M1 across the blocks from the display 1 to a first viewer nearest the display 1, performs face detection through the middle-frequency detection M2 across the blocks from the first viewer to a last viewer most distant from the display, and performs face detection through the low-frequency detection M3 across the blocks more distant from the display than the last viewer.

Next, detailed description is made on search operation of a viewer through sequential face detection from a region near the display 1 to a region distant from that in some of the above cases. In the following exemplary case, the middle-frequency detection M2 is performed at a frequency that is one fifth of the frequency of the high-frequency detection M1, and the low-frequency detection M3 is performed at a frequency that is one tenth of the frequency of the high-frequency detection M1. This, however, is not limitative. The detection frequency in each mode may be determined in consideration of capability of hardware and other factors.

Figure 8:
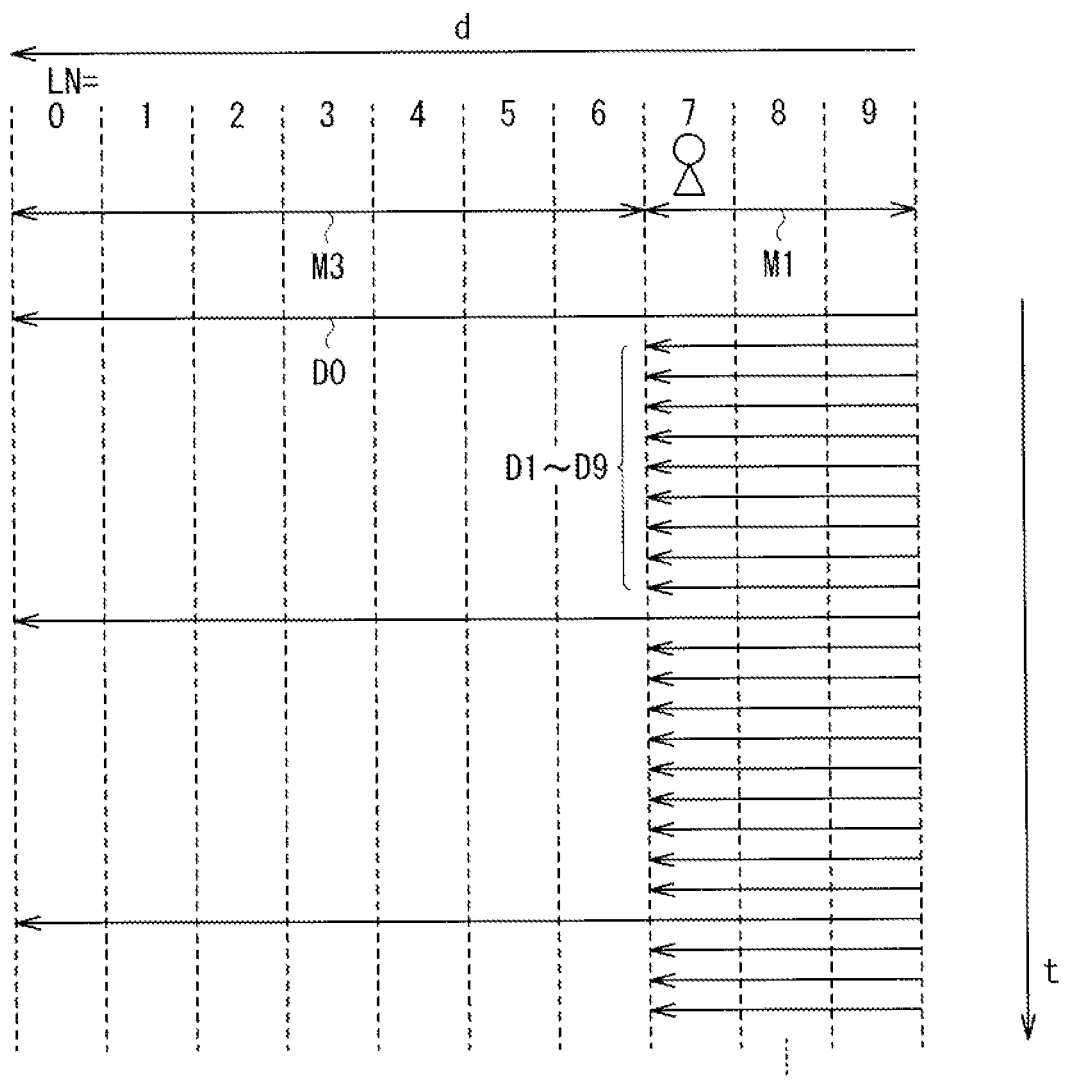
FIG. 8 is an explanatory diagram illustrating an operation example of the face detection section illustrated in FIG. 1, in the case of one viewer.

FIG. 8 illustrates search operation in the case of one viewer. FIG. 8 exemplarily illustrates detailed operation in the case C1 illustrated in (A) of FIG. 7. Specifically, the face detection section 30 performs face detection through the high-frequency detection M1 across the blocks corresponding to the layer numbers LN of 9 to 7, and performs face detection through the low-frequency detection M3 across the blocks corresponding to the layer numbers LN of 6 to 0. In detail, as illustrated in FIG. 8, first, the face detection section 30 performs search D0 across all the blocks corresponding to the layer numbers LN of 9 to 0. Then, the face detection section 30 performs search D1 to D9 only across the blocks corresponding to the layer numbers LN of 9 to 7. The face detection section 30 repeats these ten pieces of search D0 to D9 in total. Consequently, the face detection (low-frequency detection M3) is performed across the blocks corresponding to the layer numbers LN of 6 to 0 at a frequency that is one tenth of the frequency of the face detection (high-frequency detection M1) across the blocks corresponding to the layer numbers LN of 9 to 7.

Figure 9:
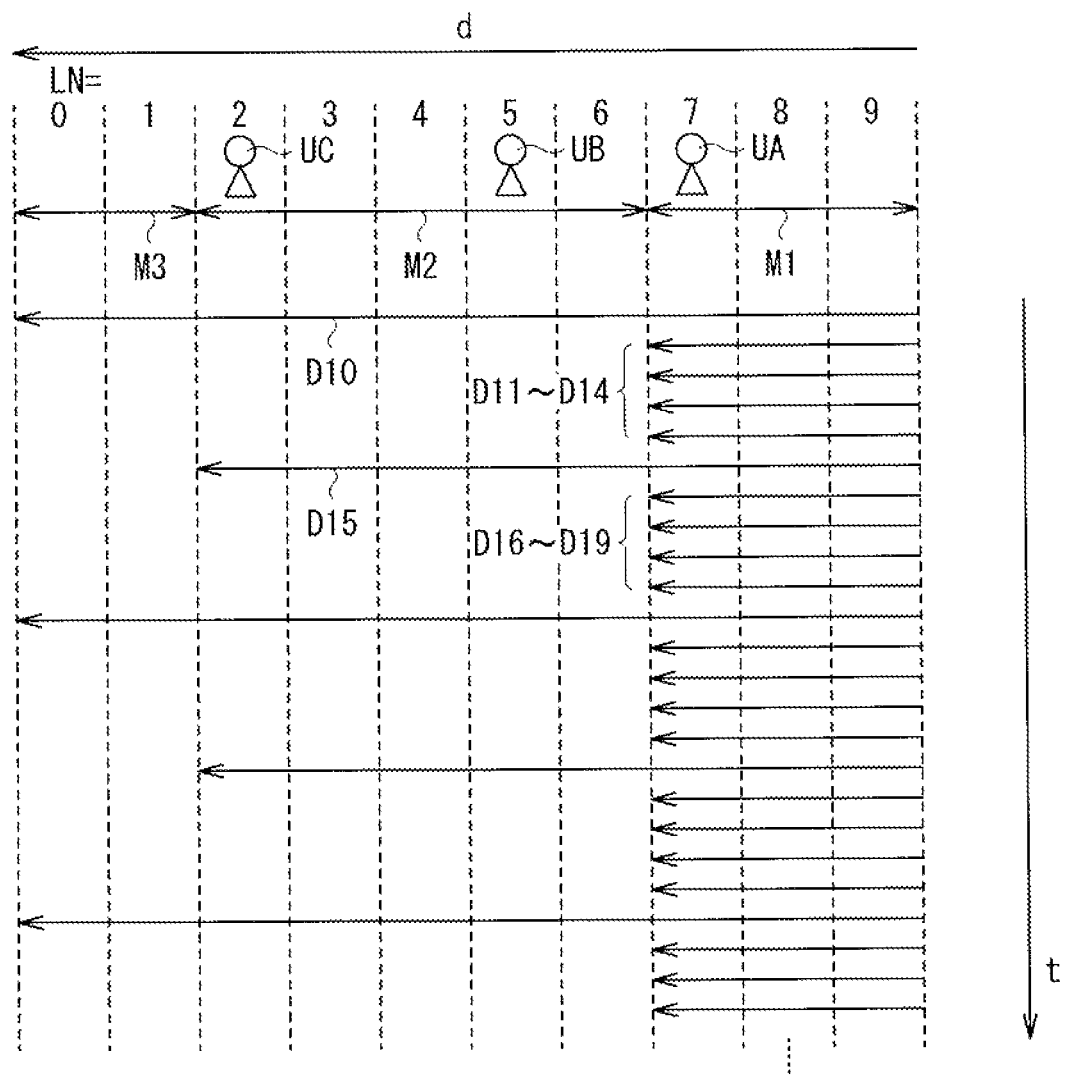
FIG. 9 is an explanatory diagram illustrating an operation example of the face detection section illustrated in FIG. 1, in the case of three viewers.

FIG. 9 illustrates search operation in the case of three viewers. FIG. 9 exemplarily illustrates detailed operation in the case C4 illustrated in (D) of FIG. 7. Specifically, the face detection section 30 performs face detection through the high-frequency detection M1 across the blocks corresponding to the layer numbers LN of 9 to 7, performs face detection through the middle-frequency detection M2 across the blocks corresponding to the layer numbers LN of 6 to 2, and performs face detection through the low-frequency detection M3 across the blocks corresponding to the layer numbers LN of 1 and 0. In detail, as illustrated in FIG. 9, first, the face detection section 30 performs search D10 across all the blocks corresponding to the layer numbers LN of 9 to 0. Then, the face detection section 30 performs search D11 to D14 only across the blocks corresponding to the layer numbers LN of 9 to 7. In addition, the face detection section 30 performs search D15 only across the blocks corresponding to the layer numbers LN of 9 to 2. Then, the face detection section 30 performs search D16 to D19 only across the blocks corresponding to the layer numbers LN of 9 to 7. The face detection section 30 repeats these ten pieces of search D10 to D19 in total. Consequently, the face detection (middle-frequency detection M2) is performed across the blocks corresponding to the layer numbers LN of 6 to 2 at a frequency that is one fifth of the frequency of the face detection (high-frequency detection M1) across the blocks corresponding to the layer numbers LN of 9 to 7, and the face detection (low-frequency detection M3) is performed across the blocks corresponding to the layer numbers LN of 1 and 0 at a frequency that is one tenth of the frequency of the face detection (high-frequency detection M1) in the blocks corresponding to the layer numbers LN of 9 to 7.

Figure 11:
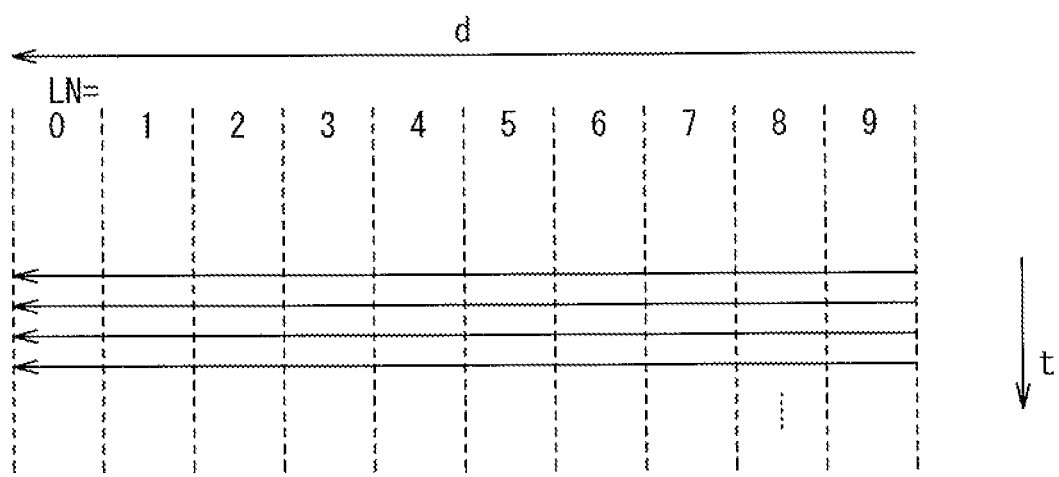
FIG. 11 is an explanatory diagram illustrating an operation example of the face detection section illustrated in FIG. 1, in the case of no viewer.

FIG. 11 illustrates search operation in the case of no viewer. In this case, the face detection section 30 operates to repeat search operation across all the blocks corresponding to the layer numbers LN of 9 to 0.

In this way, the face detection section 30 performs face detection at a high frequency (high-frequency detection M1) in the case of a layer number LN equal to or larger than the layer threshold TH1, at a middle frequency (middle-frequency detection M2) in the case of a layer number LN smaller than the layer threshold TH1 and equal to or larger than the layer threshold TH2, and at a low frequency (low-frequency detection M3) in the case of a layer number LN smaller than the layer threshold TH2. In other words, the face detection section 30 performs face detection at a relatively high frequency (high-frequency detection M1) for a viewer nearest the display 1, and performs face detection at a relatively low frequency (middle-frequency detection M2) for other viewers. Consequently, the face detection section 30 checks whether one or more viewers view the screen of the display 1 in a short process time. The process time is now described with an exemplary case of three viewers (case C4).

In the case of three viewers (case C4), as illustrated in FIG. 9, each piece of search D11 to D14 involves search of blocks of three layers corresponding to the layer numbers LN of 9 to 7. In other words, the pattern comparison section 33 detects the viewer UA through face detection within each of three photographed images Pic2 corresponding to the layer numbers LN of 9 to 7. In addition, for example, search D15 involves search of blocks of eight layers corresponding to the layer numbers LN of 9 to 2. Specifically, the pattern comparison section 33 detects the viewers UA, UB, and UC through face detection within each of eight photographed images Pic2 corresponding to the layer numbers LN of 9 to 2. In this operation, the number of layers to be searched is smaller in each piece of search D11 to D14 than in search D15, and therefore time for search operation (search time) is short in each piece of search D11 to D14 compared with in search D15.

Figure 10:
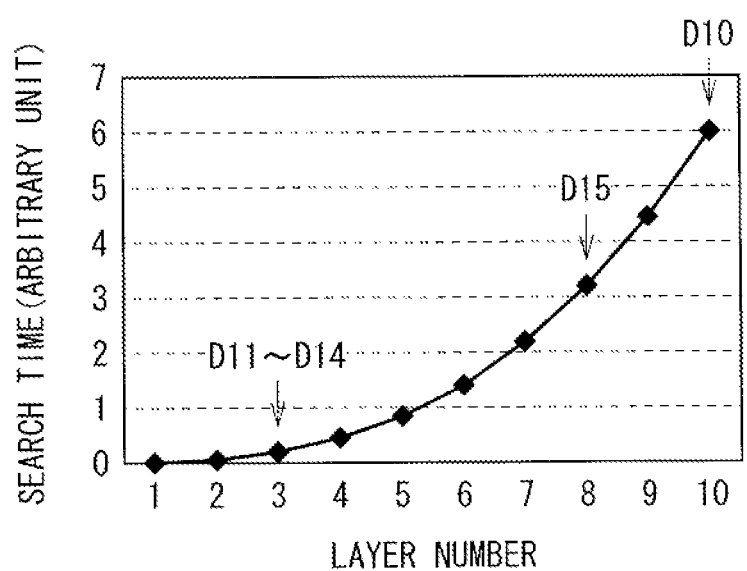
FIG. 10 is a characteristic diagram illustrating search time of the face detection section illustrated in FIG. 1.

FIG. 10 illustrates search time. In FIG. 10, the horizontal axis indicates the number of layers to be searched. As illustrated in FIG. 10, search time abruptly increases with an increase in the number of layers to be searched.

The reason for this is as follows. The face detection section 30 performs face detection while sequentially decreasing the layer number LN in search operation. In the face detection, as illustrated in FIGS. 6A and 6B, the pattern comparison section 33 compares a portion of a photographed image Pic2 in a region to be compared Rcomp to a template image Ptemp while gradually shifting the region to be compared Rcomp in horizontal and vertical directions within the photographed image Pic2 to scan the photographed image Pic2. Since the number of times of pattern comparison within a photographed image Pic2 is in proportion to the screen resolution of the photographed image Pic2 (total pixel number), a photographed image Pic2 corresponding to a smaller layer number LN (larger rate R) involves a larger number of times of pattern comparison. Accordingly, if the number of layers to be searched increases, pattern comparison is added within a photographed image Pic2 corresponding to a smaller layer number LN, resulting in an abrupt increase in search time rather than an increase in search time in proportion to an increase in the number of layers to be searched.

As illustrated in FIG. 10, search time in each piece of search D11 to D14 illustrated in FIG. 9 is about one thirtieth of search time in search D10 performed across ten layers. Consequently, the face detection section 30 reduces search time compared with, for example, a case of constant search across all the blocks corresponding to the layer numbers LN of 9 to 0 without change of detection frequency.

A typical display does not necessarily incorporate hardware having high performance. In such a display, therefore, the search D10 across all the blocks corresponding to the layer numbers LN of 9 to 0 may need search time in seconds, for example. Even in such a case, search time is extremely reduced by decreasing the number of layers to be searched, for example, as in each piece of search D11 to D14. In the case of long search time, much time is taken for search operation for photographed images Pic that are photographed by the photographing section 14 and sequentially supplied. Hence, such sequential photographed images Pic may be only partially searched. Even in such a case, a relatively large number of photographed images Pic are allowed to be searched through reducing search time as above.

In this way, the face detection section 30 performs face detection at a high frequency (high-frequency detection M1) across the blocks from the display 1 to a position of a viewer nearest the display 1. As a result, the face detection section 30 checks whether one or more viewers view the screen of the display 1 in a short process time. Consequently, the display 1 checks presence or absence of a viewer at a high frequency. As a result, for example, if a viewer looks down to start reading a magazine, the display 1 immediately turns off the backlight 17. If the viewer restarts viewing the screen of the display 1, the display 1 immediately detects a face of the viewer and turn on the backlight 17.

In addition, in the case of a plurality of viewers, the face detection section 30 performs face detection at a slightly low frequency (middle-frequency detection M2) across the blocks from the viewer nearest the display 1 to the viewer most distant from the display 1. As a result, the face detection section 30 detects all viewers in a reduced process time. Consequently, the face detection section 30 may be used not only for an application where a process is carried out based on the position of the viewer nearest the display 1, but also for an application where a process is carried out based on positions of all viewers as described later.

Furthermore, the face detection section 30 performs face detection at a low frequency (low-frequency detection M3) across the blocks behind the viewer most distant from the display. As a result, for example, even if a new viewer is added in the blocks, the viewer is detected.

Moreover, when a viewer is at a position a predetermined distance away from the display 1, face detection of the viewer may by useless depending on a placed site of the display 1. In detail, for example, in the case where the display 1 is placed in a small room, even if face detection is performed over a distance from the display 1 to a wall in front of the display 1, no face is detected. Even in such a case, the display 1 reduces frequency of face detection across the blocks behind the viewer most distant from the display 1, leading to a reduction in ratio of process time for such detection operation to the total process time.

Operation of the face detection section 30 is now described with a flowchart.

Figure 12:
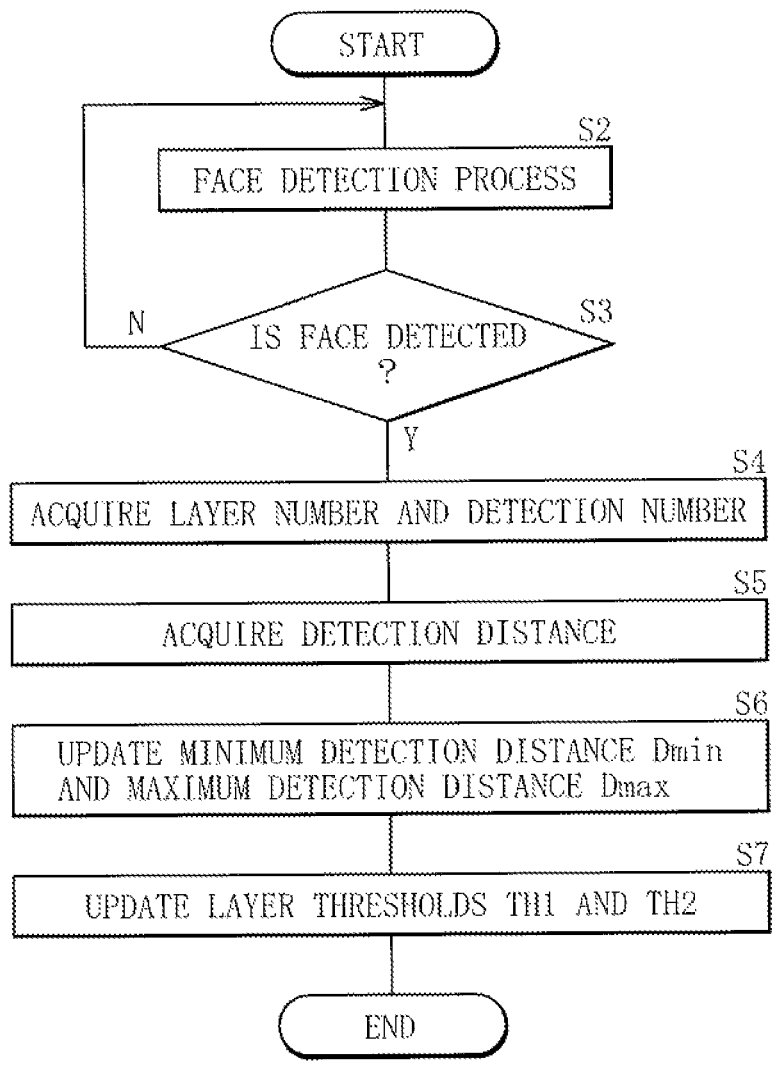
FIG. 12 is a flowchart illustrating an operation example of the face detection section illustrated in FIG. 1.

FIG. 12 illustrates a flowchart of search operation by the face detection section 30. In FIG. 12, the minimum detection distance Dmin is a variable for storing a distance d from the display 1 to a viewer nearest the display 1, and the maximum detection distance Dmax is a variable for storing a distance d from the display 1 to a viewer most distant from the display 1.

The face detection section 30 sequentially performs face detection from a region near the display 1 to a region distant from that, and then acquires a layer number LN at which a face is detected, and sets the frequency of face detection based on the layer number LN. This is described in detail below.

First, the face detection section 30 sequentially performs face detection from a region near the display 1 to a region distant from that (step S2). In detail, the pattern comparison control section 35 instructs the image resizing section 31 to decrease the layer number LN in order from 9. The image resizing section 31 forms photographed images Pic2 while increasing the rate R for size reduction of a photographed image Pic in order according to that instruction. Then, the pattern comparison section 33 performs face detection through pattern comparison using the photographed images Pic2 supplied from the image resizing section 31 and a template image Ptemp. In that operation, the pattern comparison control section 35 controls the image resizing section 31 and the pattern comparison section 33 to perform face detection at a frequency based on the layer thresholds TH1 and TH2 stored in the memory 36. Then, the face detection section 30 determines whether a face is detected in the face detection process (step S3). If the face detection section 30 determines detection of a face, the process advances to step S4. If the face detection section 30 does not determine detection of a face, the process returns to step S2 for a next face detection process.

If the face detection section 30 determines detection of a face in the face detection process of step S2, the processing section 34 of the face detection section 30 acquires information of a layer number LN associated with a photographed image Pic2 in which a face of a viewer is detected, the number of detected faces (detection number), and the like from the detection result in the face detection process (step S4).

Then, the processing section 34 of the face detection section 30 acquires a distance d (detection distance) from the display 1 to each viewer, based on the layer number LN corresponding to the viewer acquired in step S4 (step S5).

Then, the processing section 34 of the face detection section 30 updates the minimum detection distance Dmin and the maximum detection distance Dmax (step S6). In detail, the processing section 34 sets a distance d associated with the viewer nearest the display 1, among the viewers, as the minimum detection distance Dmin, and sets a distance d associated with the viewer most distant from the display 1 as the maximum detection distance Dmax.

Then, the face detection section 30 updates each of the layer thresholds TH1 and TH2 (step S7). In detail, first, the processing section 34 obtains a layer number LN corresponding to the minimum detection distance Dmin acquired in step S6, and supplies the layer number LN as the layer threshold TH1 to the pattern comparison control section 35. In addition, the processing section 34 obtains a layer number LN corresponding to the maximum detection distance Dmax acquired in step S6, and supplies the layer number LN as the layer threshold TH2 to the pattern comparison control section 35. Then, the memory 36 in the pattern comparison control section 35 stores the updated layer thresholds TH1 and TH2 therein.

This is the end of flow of the search operation.

Thereafter, the face detection section 30 executes this flow in subsequent search operation. In that operation, the face detection process (step S2) is performed at a frequency based on the layer thresholds TH1 and TH2 updated in step S7 of the previous search operation. In this way, the face detection section 30 updates each of the layer thresholds TH1 and TH2 at every search operation, and sets the frequency of face detection based on the updated layer thresholds TH1 and TH2.

It is to be noted that the face detection section 30 is desirably configured to maintain the layer thresholds TH1 and TH2 even if the display 1 is in a standby mode, for example. According to such a configuration, when the display 1 is returned from the standby mode to an operation mode, the face detection section 30 checks whether one or more viewers view a screen in a short process time.

Next, description is made on operation of the face detection section 30 in the case where a viewer viewing the screen of the display 1 moves.

Figure 13:
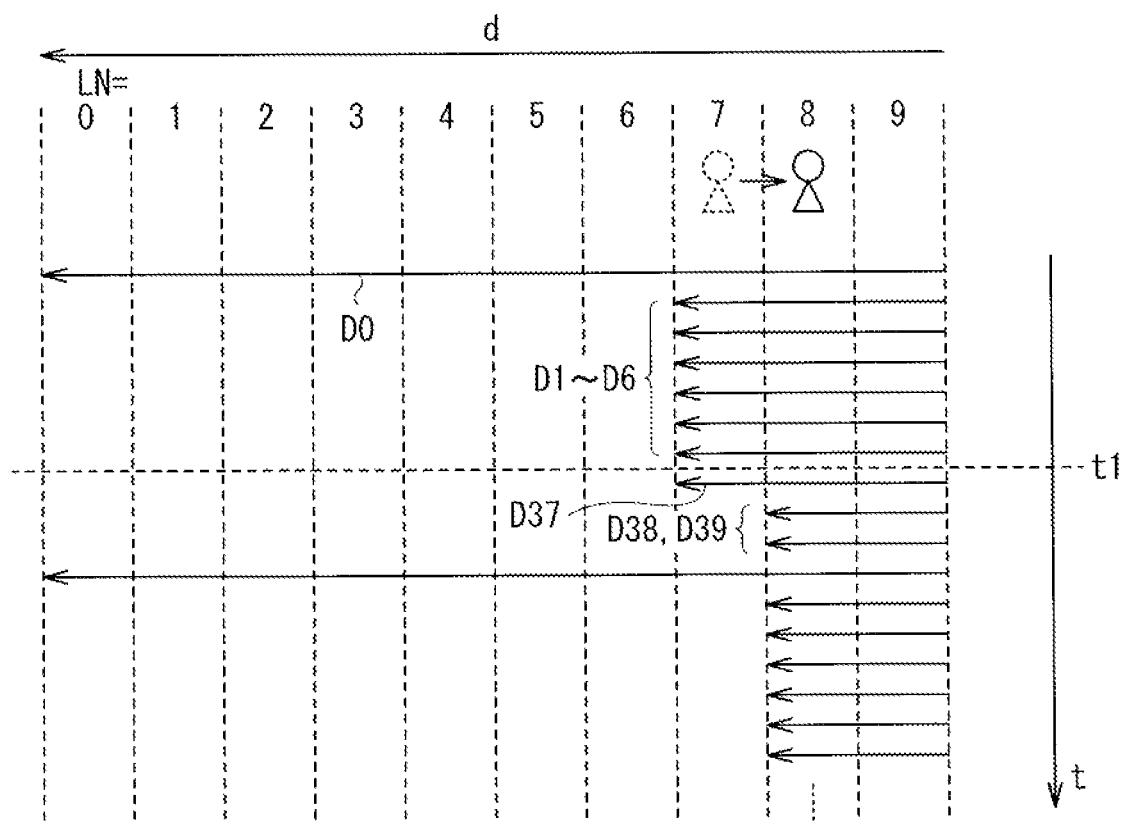
FIG. 13 is an explanatory diagram illustrating another operation example of the face detection section illustrated in FIG. 1.
Figure 14:
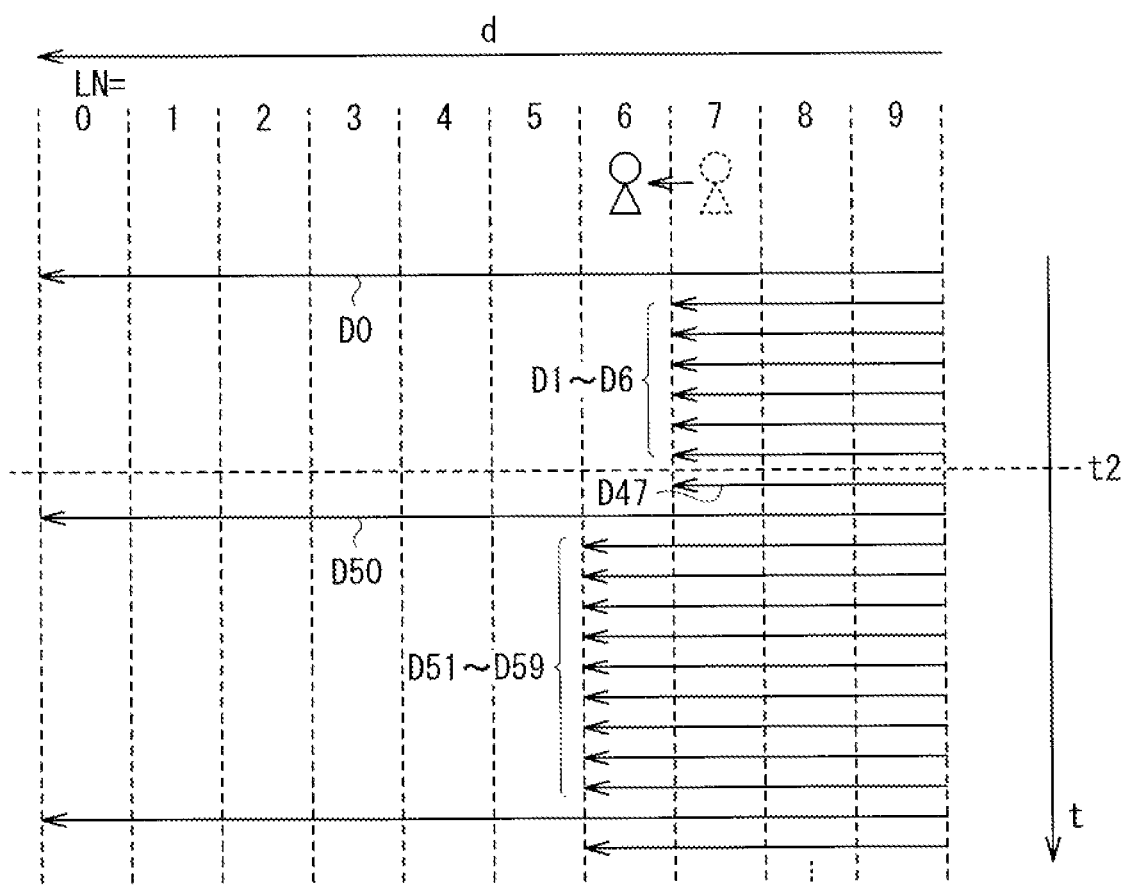
FIG. 14 is an explanatory diagram illustrating another operation example of the face detection section illustrated in FIG. 1.

FIGS. 13 and 14 illustrate search operation in the case of one viewer, where FIG. 13 illustrates a case where the viewer moves closer to the display 1, and FIG. 14 illustrates a case where the viewer moves away from the display 1. In this exemplary case, it is assumed that the viewer is initially at a position corresponding to the layer number LN of 7 as in the case C1 ((A) of FIG. 7 and FIG. 8).

As illustrated in FIGS. 13 and 14, in the case where the viewer is initially at the position corresponding to the layer number LN of 7, the face detection section 30 performs search D0 to D6 as in the case illustrated in FIG. 8.

As illustrated in FIG. 13, if the viewer moves closer to the display 1 at timing t1, the face detection section 30 then searches blocks corresponding to the layer numbers LN of 9 to 7 in subsequent search D37, as in the search D1 to D6. In the search D37, the face detection section 30 detects shift of the viewer from the position corresponding to the layer number LN of 7 to a position corresponding to the layer number LN of 8. Thus, the face detection section 30 searches only blocks corresponding to the layer numbers LN of 9 and 8 in subsequent search D38 or later. In other words, the face detection section 30 operates to minimize the number of layers to be searched. Consequently, the face detection section 30 checks whether one or more viewers view the screen of the display 1 in a short process time.

As illustrated in FIG. 14, if the viewer moves away from the display 1 at timing t2, the face detection section 30 then searches blocks corresponding to the layer numbers LN of 9 to 7 in subsequent search D47, as in the search D1 to D6. In the search D47, the face detection section 30 detects absence of the viewer from the blocks corresponding to the layer numbers LN 9 to 7. Thus, the face detection section 30 searches all the blocks corresponding to the layer numbers LN of 9 to 0 in subsequent search D50. In the search D50, the face detection section 30 detects the viewer at a position corresponding to the layer number LN of 6. Thus, the face detection section 30 searches blocks corresponding to the layer numbers LN of 9 to 6 in subsequent search D51 or later. In this way, even if a viewer moves away from the display 1, the face detection section 30 immediately detects the viewer and changes blocks to be searched depending on the position of the moved viewer.

Figure 15:
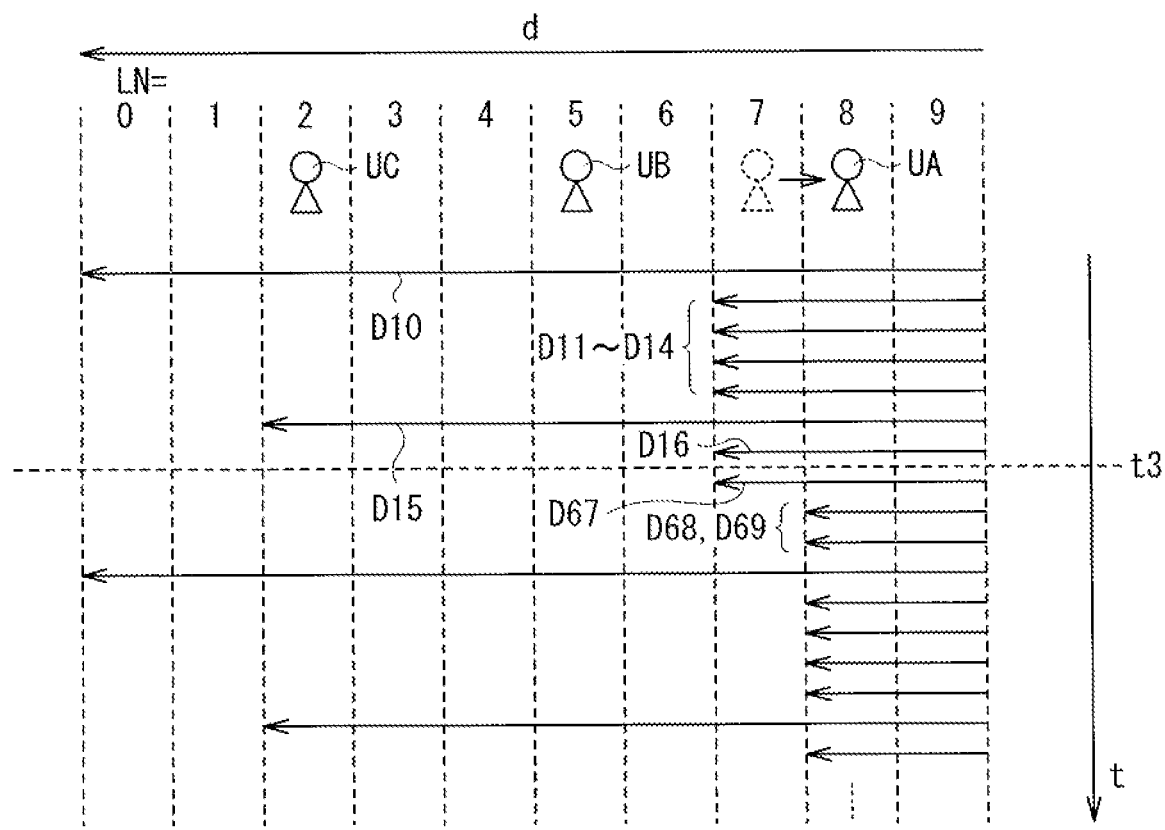
FIG. 15 is an explanatory diagram illustrating another operation example of the face detection section illustrated in FIG. 1.
Figure 16:
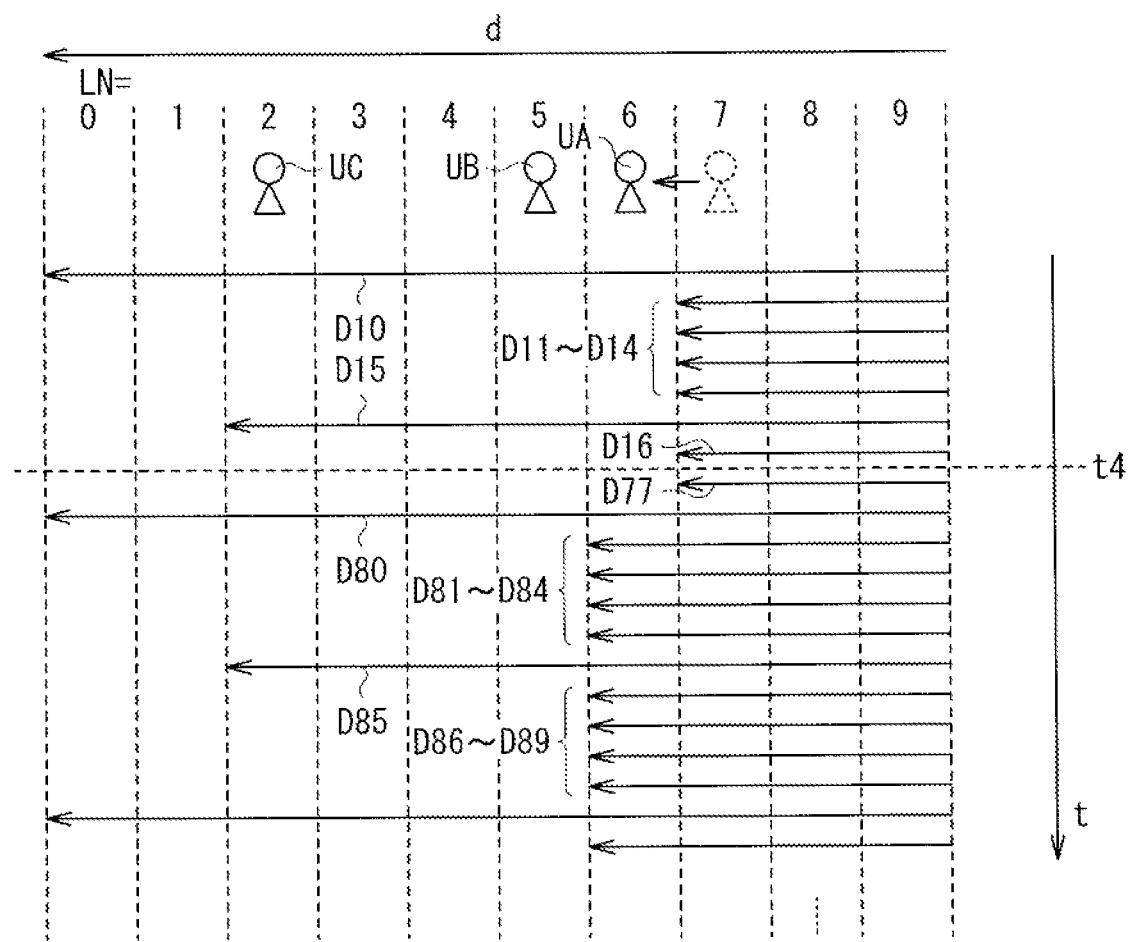
FIG. 16 is an explanatory diagram illustrating another operation example of the face detection section illustrated in FIG. 1.

FIGS. 15 and 16 each illustrate search operation in the case of three viewers, where FIG. 15 illustrates a case where a viewer nearest the display 1 among the three viewers moves closer to the display 1, and FIG. 16 illustrates a case where the viewer nearest the display 1 moves away from the display 1. In this exemplary case, it is assumed that the respective three viewers are initially at positions corresponding to the layer numbers LN of 7, 5, and 2 as in the case C4 ((D) of FIG. 7 and FIG. 9).

As illustrated in FIGS. 15 and 16, in the case where the viewer UA nearest the display 1 is initially at a position corresponding to the layer number LN of 7, the face detection section 30 performs search D10 to D16 as in the case illustrated in FIG. 9.

As illustrated in FIG. 15, if the viewer UA moves closer to the display 1 at timing t3, the face detection section 30 then searches blocks corresponding to the layer numbers LN of 9 to 7 in subsequent search D67, as in the search D11 to D14 and D16. In the search D67, the face detection section 30 detects shift of the viewer from the position corresponding to the layer number LN of 7 to a position corresponding to the layer number LN of 8. Thus, the face detection section 30 searches only blocks corresponding to the layer numbers LN of 9 and 8 in subsequent search D68 or later. In other words, the face detection section 30 operates to minimize the number of layers to be searched. Consequently, the face detection section 30 checks whether one or more viewers view the screen of the display 1 in a short process time.

As illustrated in FIG. 16, if the viewer UA moves away from the display 1 at timing t4, the face detection section 30 then searches blocks corresponding to the layer numbers LN of 9 to 7 in subsequent search D77, as in the search D11 to D14 and D16. In the search D77, the face detection section 30 detects absence of the viewer UA from the blocks corresponding to the layer numbers LN 9 to 7. Thus, the face detection section 30 searches all the blocks corresponding to the layer numbers LN of 9 to 0 in subsequent search D80. In the search D80, the face detection section 30 detects the viewer UA at a position corresponding to the layer number LN of 6. Thus, the face detection section 30 searches blocks corresponding to the layer numbers LN of 9 to 6 in subsequent search D81 or later. In this way, even if a viewer moves away from the display 1, the face detection section 30 immediately detects the viewer and changes blocks to be searched depending on the position of the moved viewer.

In this way, even if a viewer moves, the display 1 immediately detects the viewer and changes blocks to be searched depending on the position of the moved viewer.

[Effects]

As described above, in the first embodiment, since face detection is performed at a high frequency across the blocks from the display to the position of the viewer nearest the display, whether one or more viewers view the screen of the display is checked in a short process time.

In addition, in the first embodiment, since face detection is performed at a slightly low frequency across the blocks from the viewer nearest the display to the viewer most distant from the display, all viewers are detected with a reduced process time.

Furthermore, in the first embodiment, face detection is performed at a low frequency across the blocks behind the viewer most distant from the display. As a result, even if a new viewer is added in the blocks, the viewer is detected, while the ratio of process time for face detection operation across the blocks to the total process time is reduced.

[Modification 1-1]

Although the backlight 17 is controlled to be turned on or off based on a detection result by the face detection section 30 in the first embodiment, this is not limitative. This is described in detail below.

Figure 17:
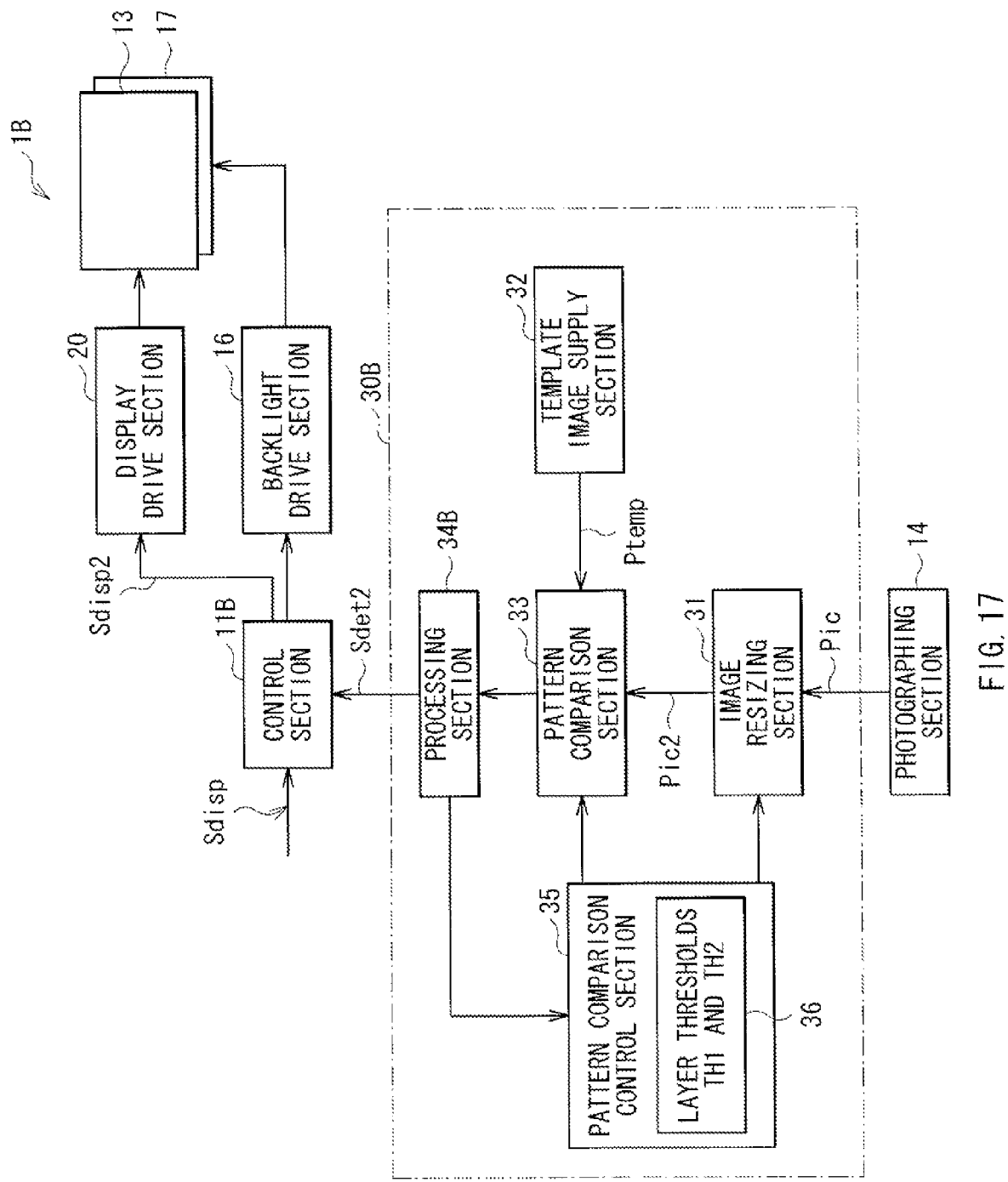
FIG. 17 is a block diagram illustrating an exemplary configuration of a display according to a modification of the first embodiment.

FIG. 17 illustrates an exemplary configuration of a display 1B according to modification 1-1. The display 1B changes an image or the like displayed on the liquid crystal display section 13, based on a detection result by the face detection section 30. In this exemplary case, the display 1B has a function of notifying a viewer to move away from the screen of the display 1B if the viewer is extremely close to the screen.

The display 1B includes a face detection section 30B, a control section 11B, and a backlight drive section 16B. The face detection section 30B includes a processing section 34B. The processing section 34B supplies a distance d from the display 1B to a viewer nearest the display 1B as a face detection signal Sdet2, based on a face detection result by the pattern comparison section 33. The control section 11B processes an image signal such that, if a distance between the display 1B and the viewer is shorter than a predetermined distance, "get away from a screen!" is shown in a form of, for example, on-screen display (OSD), based on the face detection signal Sdet2 supplied from the processing section 34B of the face detection section 30. The backlight drive section 16B drives the backlight 17 based on a control signal supplied from the control section 11B.

According to such a configuration of the display 1B, if a viewer is extremely close to the screen of the display 1B, a message is displayed to prompt the viewer to get away from the screen. In that operation, since the face detection section 30B performs face detection at a high frequency (high-frequency detection M1) across the blocks from the display 1B to a position of a viewer nearest the display 1B, the face detection section 30B detects the viewer in a short process time, as in the face detection section 30 according to the first embodiment. Consequently, for example, even if a child suddenly gets close to the screen, the display 1B immediately prompts the child to get away from the screen. It is to be noted that, although a message is displayed to notify a viewer of an event in the exemplary case, this is not limitative. For example, sound may be used to notify a viewer of the event instead of or in addition to that.

[Modification 1-2]

Figure 18:
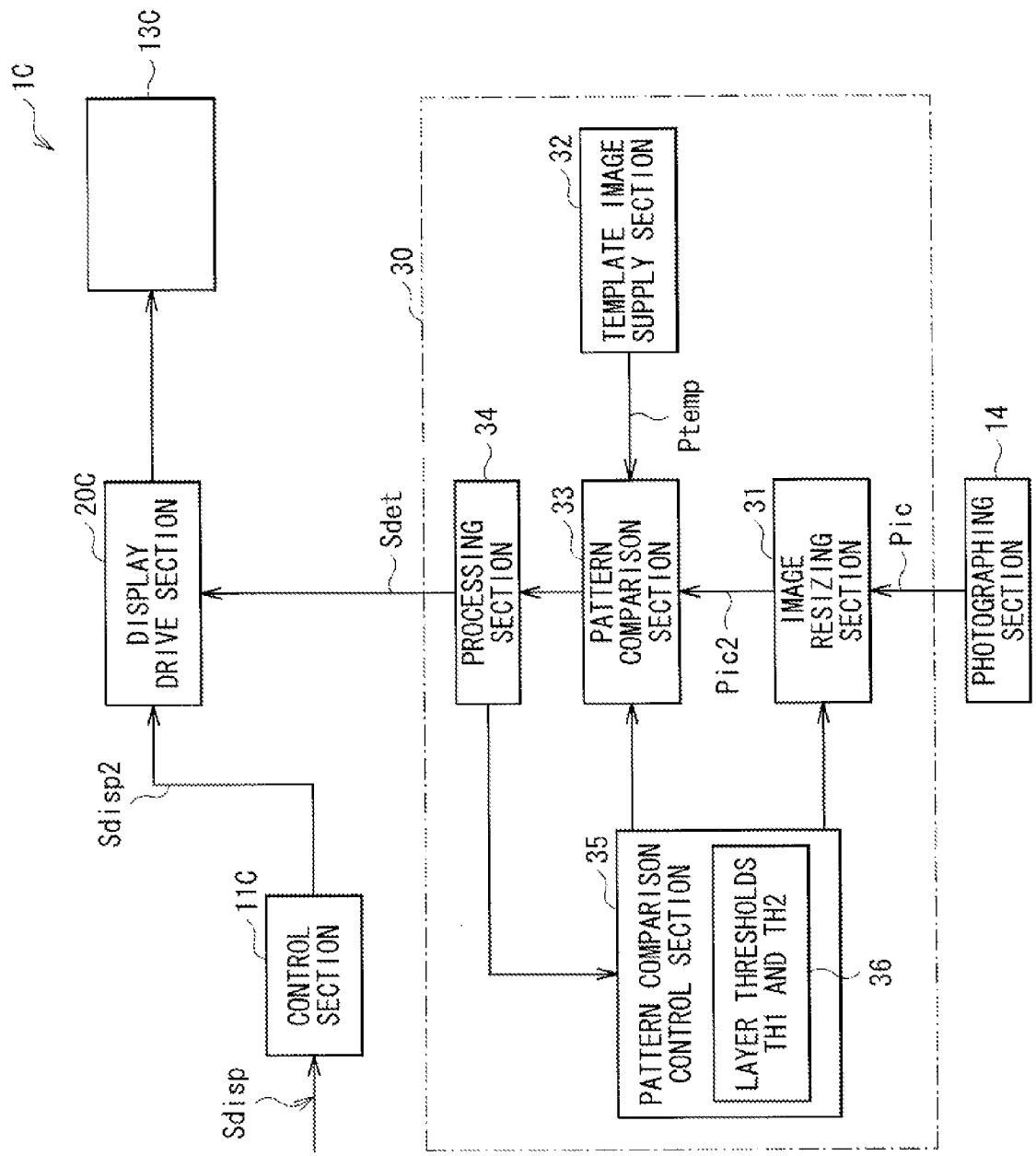
FIG. 18 is a block diagram illustrating an exemplary configuration of a display according to another modification of the first embodiment.

Although the liquid crystal display section 13 performs display operation in the first embodiment, this is not limitative. Alternatively, for example, an electro-luminescence (EL) display section 13C may perform display operation, as illustrated in FIG. 18. In this case, for example, the face detection section 30 may control the EL display section 13C to perform black display in the case of no viewer.

[Modification 1-3]

Although the face detection section 30 performs size reduction of the photographed image Pic to form the photographed image Pic2, and performs face detection through pattern comparison between the photographed image Pic2 and the template image Ptemp, this is not limitative. This is described in detail below with an exemplary case.

Figure 19:
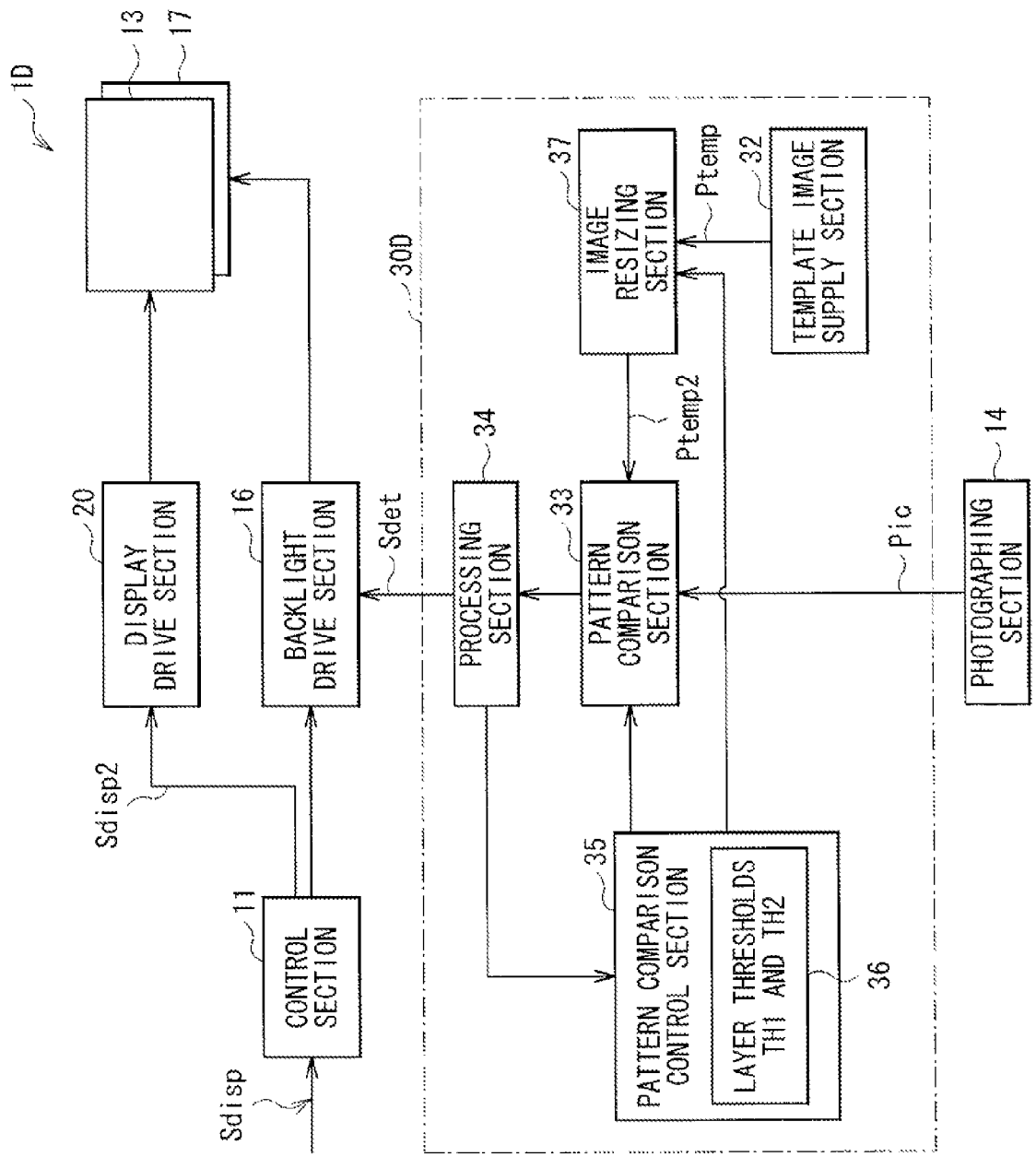
FIG. 19 is a block diagram illustrating an exemplary configuration of a display according to another modification of the first embodiment.

FIG. 19 illustrates an exemplary configuration of a display 1D according to modification 1-3. The display 1D includes a face detection section 30D. The face detection section 30D includes an image resizing section 37. The image resizing section 37 forms a template image Ptemp2 through scaling of the template image Ptemp supplied from the template image supply section 32, and supplies the template image Ptemp2 to the pattern comparison section 33.

According to this configuration, the face detection section 30D generates the template image Ptemp2 through scaling of the template image Ptemp, and performs a face detection through pattern comparison between a photographed image Pic and the template image Ptemp2.

Figure 20A:
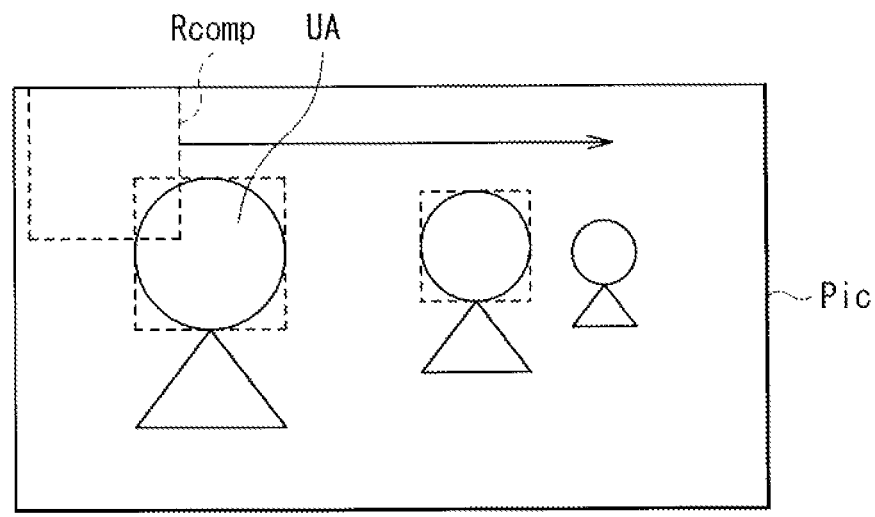
FIGS. 20A and 20B are explanatory diagrams illustrating another operation example of a face detection section illustrated in FIG. 19.
Figure 20B:
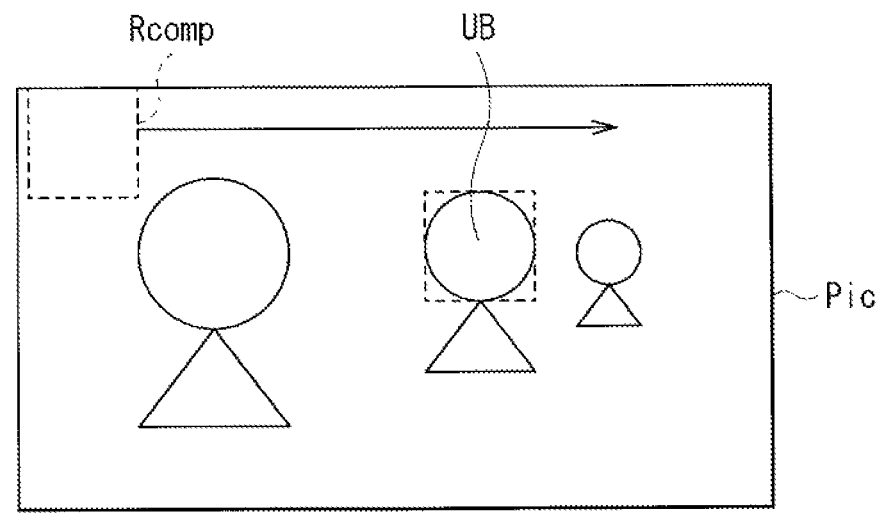

FIGS. 20A and 20B each illustrate an operation example of pattern comparison according to the modification 1-3, where FIG. 20A illustrates an operation example in the case of using a template image Ptemp2 formed through scaling at a first rate RD, and FIG. 20B illustrates an operation example in the case of using another template image Ptemp2 formed through scaling at a second rate RD.

The image resizing section 37 forms template images Ptemp2 through scaling of the template image Ptemp at various rates RD according to an instruction from the pattern comparison control section 35, and supplies the template images Ptemp2 to the pattern comparison section 33. The pattern comparison section 33 gradually shifts a region to be compared Rcomp having the same size as that of each template image Ptemp2 in horizontal and vertical directions to scan the photographed image Pic, and concurrently performs pattern comparison between a portion of the photographed image Pic in the region to be compared Rcomp and the template image Ptemp2. Consequently, in the operation example illustrated in FIG. 20A, the face detection section 30D detects a face of a viewer UA viewing a screen at a position near the display 1D. In the operation example illustrated in FIG. 20B, the face detection section 30D detects a face of a viewer UB viewing the screen at a position slightly distant from the display 1D. In this way, the face detection section 30D detects viewers at various distances d from the display 1D.

[Modification 1-4]

In the first embodiment, as illustrated in steps S4 and S5 of FIG. 12, a distance d from a display to a viewer is obtained based on a layer number LN at which the face of the viewer is detected. In that operation, the viewer may be determined to be a child or an adult based on, for example, a photographed image Pic so that the distance d is corrected based on that determination result. Specifically, even if an adult face and a child face are detected together in a photographed image Pict associated with the same layer number LN, the child viewer is likely to be actually at a position distant from the display compared with the adult viewer in consideration that a child face is usually smaller than an adult face. Accordingly, the distance d from the display to a viewer is obtained while being corrected in consideration of a difference in size between a child face and an adult face, so that information of a distance associated with each viewer is more accurately obtained.

[Modification 1-5]

In the first embodiment, as illustrated in FIG. 12, a distance d from a display to a viewer is obtained based on a layer number LN at which the face of the viewer is detected, and the layer thresholds TH1 and TH2 are obtained based on the distance d. This, however, is not limitative. Alternatively, for example, the layer thresholds TH1 and TH2 may be directly obtained from that layer number LN. In this case, for example, among the layer numbers LN at which faces of viewers are detected, a largest layer number LN may be set to the layer threshold TH1, and a smallest layer number LN may be set to the layer threshold TH2.

[Modification 1-6]

Although the middle-frequency detection M2 is performed at a frequency that is one fifth of the frequency of the high-frequency detection M1, and the low-frequency detection M3 is performed at a frequency that is one tenth of the frequency of the high-frequency detection M1 in the first embodiment, this is not limitative. Alternatively, such frequencies may be designed to be dynamically changed. For example, modification 1-6 is effective in the case where another application is executed based on a detection result by the face detection section 30. Specifically, during execution of the application, if whether one or more viewers view a screen is desired to be exclusively checked, the middle-frequency detection M2 may be performed at a lower frequency. On the other hand, if the number of viewers is desired to be determined, the middle-frequency detection M2 may be performed at a higher frequency.

[2. Second Embodiment]

A display 2 according to a second embodiment is now described. The second embodiment is configured such that a photographed image Pic is divided into a plurality of regions, and frequency of face detection may be changed for each of the divided regions. Here, description is made on an exemplary case where a photographed image Pic is divided into two, or right and left regions. It is to be noted that substantially the same components as those of the display 1 according to the first embodiment are designated by the same numerals, and description of them is appropriately omitted.

Figure 21:
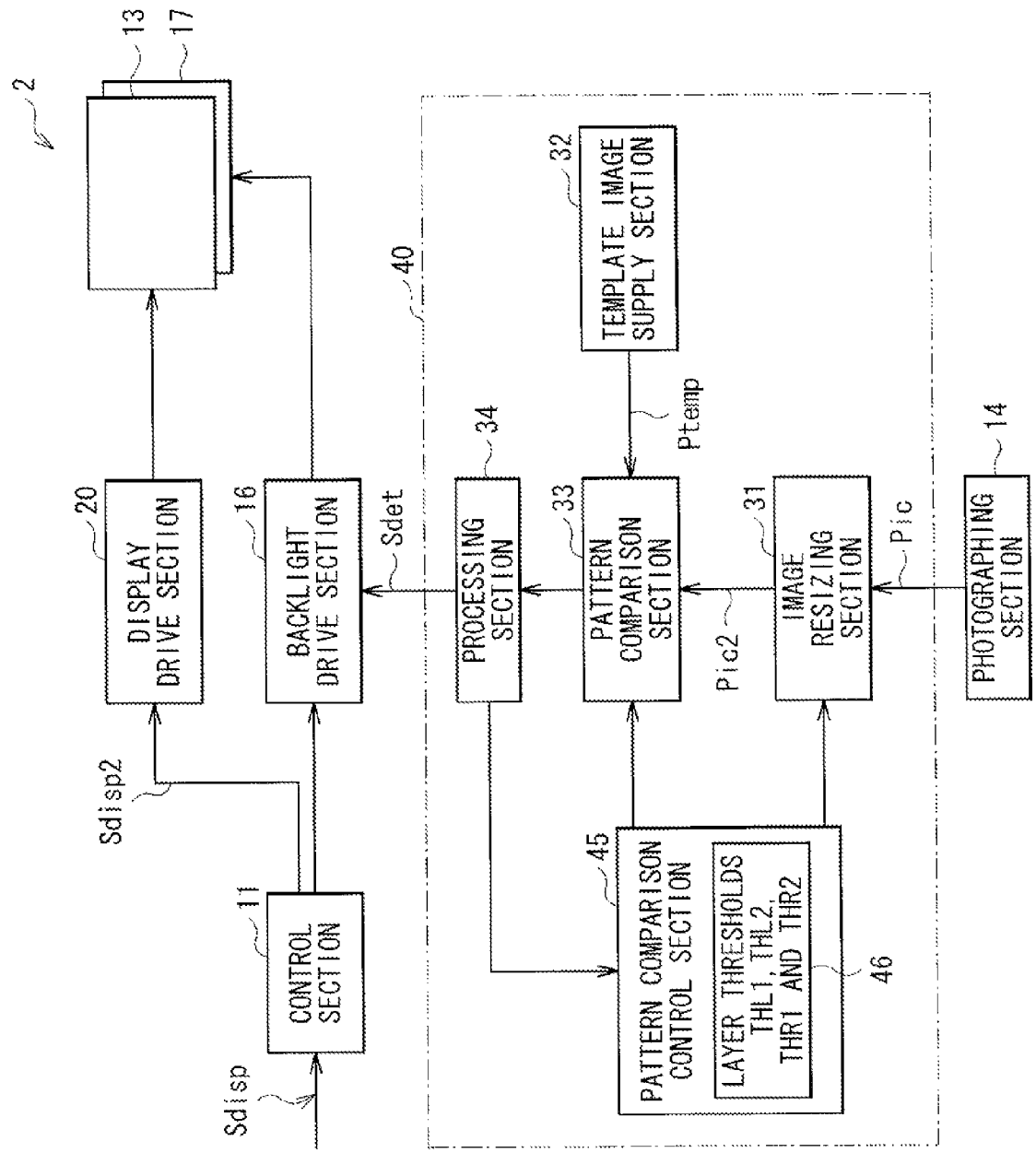
FIG. 21 is a block diagram illustrating an exemplary configuration of a display according to a second embodiment.

FIG. 21 illustrates an exemplary configuration of a display 2 according to the second embodiment. The display 2 includes a face detection section 40. The face detection section 40 includes a pattern comparison control section 45. The pattern comparison control section 45 includes a memory 46 that stores four layer thresholds THL1, THL2, THR1, and THR2 therein. The pattern comparison control section 45 controls the image resizing section 31 and the pattern comparison section 33 to perform sequential face detection from a region near the display 2 to a region distant from that, as in the pattern comparison control section 35 according to the first embodiment. In that operation, the pattern comparison control section 45 controls the image resizing section 31 and the pattern comparison section 33 to perform face detection at a frequency based on the layer thresholds THL1 and THL2 for an image at a left half of the photographed image Pic, and perform face detection at a frequency based on the layer thresholds THR1 and THR2 for an image at a right half thereof.

Figure 22A:
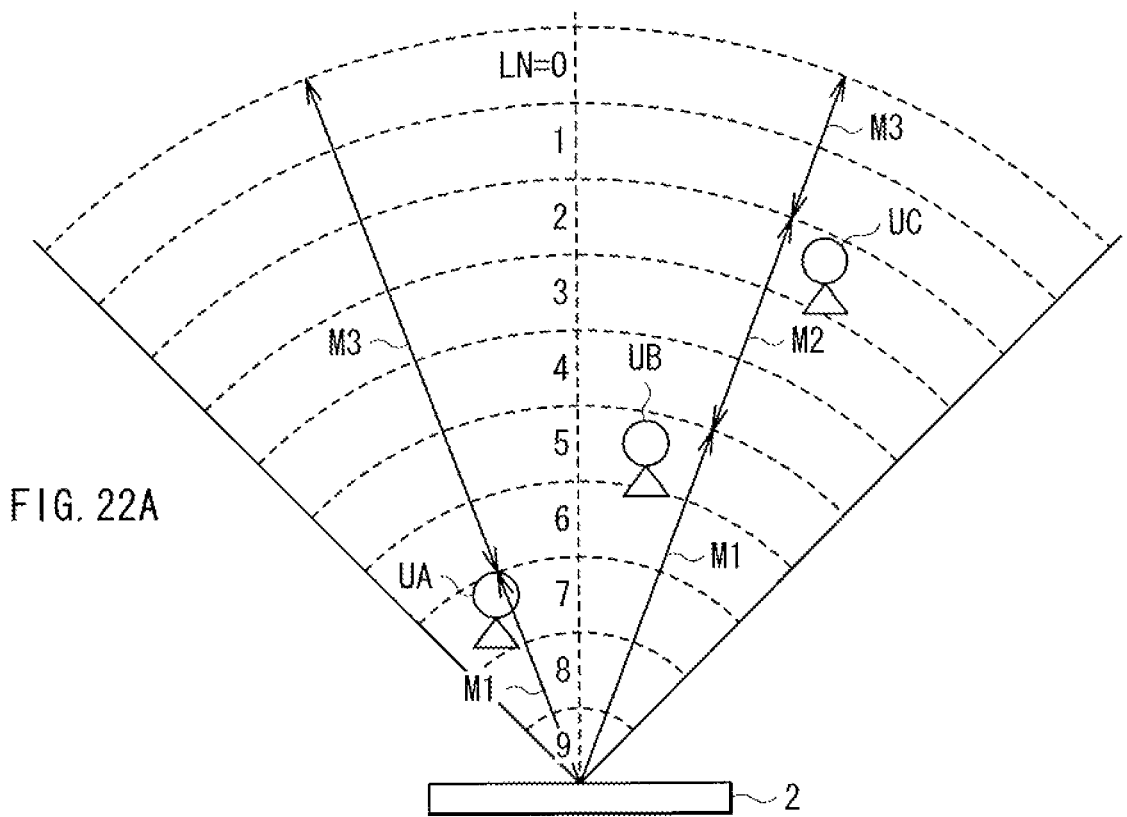
FIGS. 22A and 22B are explanatory diagrams illustrating an operation example of a face detection section illustrated in FIG. 21.
Figure 22B:
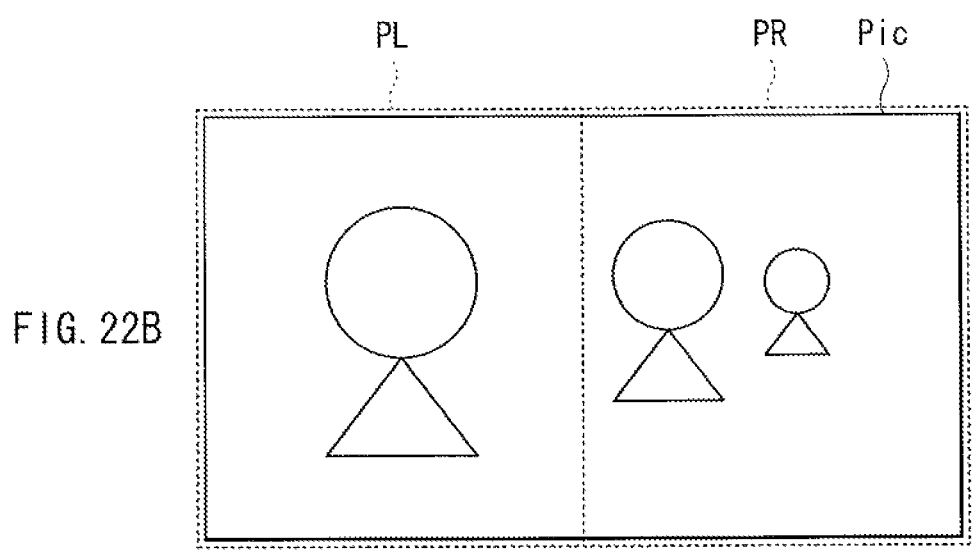

FIGS. 22A and 22B illustrate an example of operation of the face detection section 40, where FIG. 22A illustrates an example of positions of viewers viewing the display 2, and FIG. 22B illustrates an example of the photographed image Pic.

The photographing section 14 photographs viewers UA, UB, and UC viewing the display 2 as illustrated in FIG. 22A to acquire a photographed image Pic as illustrated in FIG. 22B, as in the case of the first embodiment. The face detection section 40 performs face detection while setting different frequencies for an image in a region PL at the left half of the photographed image Pic and for an image in a region PR at the right half thereof.

In detail, at the left side as viewed from the display 2, as illustrated in FIG. 22A, the face detection section 40 performs face detection through the high-frequency detection M1 across blocks corresponding to the layer number LN of 9 to 7, and performs face detection through the low-frequency detection M3 across blocks corresponding to the layer number LN of 6 to 0. In other words, since the viewer UA is at a position corresponding to the layer number LN of 7 at the left side as viewed from the display 2, both the layer threshold THL1 and the layer threshold THL2 are set to "7". Thus, the face detection section 40 performs face detection through the high-frequency detection M1 across the blocks corresponding to the layer numbers LN of 9 to 7 which are each equal to or larger than the layer threshold THL1 (=7). In addition, the face detection section 40 performs face detection through the low-frequency detection M3 across the blocks corresponding to the layer numbers LN of 6 to 0 which are each smaller than the layer threshold THL2 (=2). It is to be noted that the middle-frequency detection M2 is not performed in this exemplary case since the layer thresholds THL1 and THL2 are equal to each other.

At the right side as viewed from the display 2, as illustrated in FIG. 22A, the face detection section 40 performs face detection through the high-frequency detection M1 across blocks corresponding to the layer number LN of 9 to 5, performs face detection through the middle-frequency detection M2 across blocks corresponding to the layer number LN of 4 to 2, and performs face detection through the low-frequency detection M3 across blocks corresponding to the layer number LN of 1 and 0. In other words, at the right side as viewed from the display 2, since the viewer UB is at a position corresponding to the layer number LN of 5, and the viewer UC is at a position corresponding to the layer number LN of 2, the layer threshold THR1 is set to "5", and the layer threshold THR2 is set to "2". Thus, the face detection section 40 performs face detection through the high-frequency detection M1 across the blocks corresponding to the layer numbers LN of 9 to 5 which are each equal to or larger than the layer threshold THR1 (=5). In addition, the face detection section 40 performs face detection through the middle-frequency detection M2 across the blocks corresponding to the layer numbers LN of 4 to 2 which are each smaller than the layer threshold THR1 (=5) and equal to or larger than the layer threshold THR2 (=2). In addition, the face detection section 40 performs face detection through the low-frequency detection M3 across blocks corresponding to the layer numbers LN of 1 and 0 which are each smaller than the layer threshold THR2 (=2).

Figure 23:
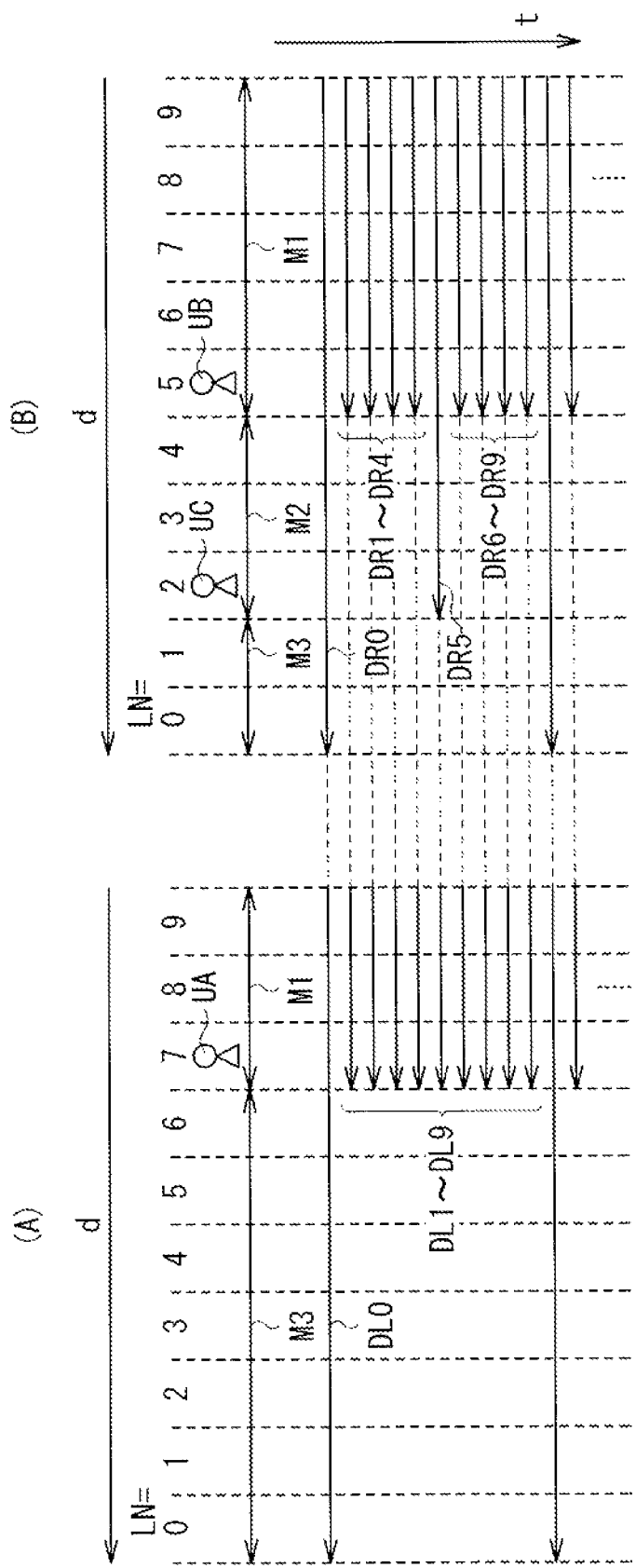
FIG. 23 is another explanatory diagram illustrating the operation example of the face detection section illustrated in FIG. 21.

(A) of FIG. 23 illustrates search operation at the left side as viewed from the display 2, and (B) of FIG. 23 illustrates search operation at the right side as viewed from the display 2.

At the left side as viewed from the display 2, as illustrated in (A) of FIG. 23, first, the face detection section 40 performs search DL0 across all the blocks corresponding to the layer numbers LN of 9 to 0. Then, the face detection section 40 performs search DL1 to DL9 only across the blocks corresponding to the layer numbers LN of 9 to 7. The face detection section 40 repeats the ten pieces of search DL0 to DL9. Consequently, the face detection (low-frequency detection M3) is performed across the blocks corresponding to the layer numbers LN of 6 to 0 at a frequency that is one tenth of the frequency of the face detection (high-frequency detection M1) across the blocks corresponding to the layer numbers LN of 9 to 7.

At the right side as viewed from the display 2, as illustrated in (B) of FIG. 23, first, the face detection section 40 performs search DR0 across all the blocks corresponding to the layer numbers LN of 9 to 0. Then, the face detection section 40 performs search DR1 to DR4 only across the blocks corresponding to the layer numbers LN of 9 to 5. In addition, the face detection section 40 performs search DR5 only across the blocks corresponding to the layer numbers LN of 9 to 2. Then, the face detection section 40 performs search DR6 to DR9 only across the blocks corresponding to the layer numbers LN of 9 to 5. The face detection section 40 repeats these ten pieces of search DR0 to DR9. Consequently, face detection (middle-frequency detection M2) is performed across the blocks corresponding to the layer numbers LN of 4 to 2 at a frequency that is one fifth of the frequency of the face detection (high-frequency detection M1) across the blocks corresponding to the layer numbers LN of 9 to 5, and face detection (low-frequency detection M3) is performed across the blocks corresponding to the layer numbers LN of 1 and 0 at a frequency that is one tenth of the frequency of the face detection (high-frequency detection M1) across the blocks corresponding to the layer numbers LN of 9 to 5.

As illustrated in FIG. 23, each piece of search DL0 to DL9 at the left side as viewed from the display 2 is performed at timing corresponding to timing of each piece of search DR0 to DR9 at the right side as viewed from the display 2. This is described below with a specific example.

Figure 24A:
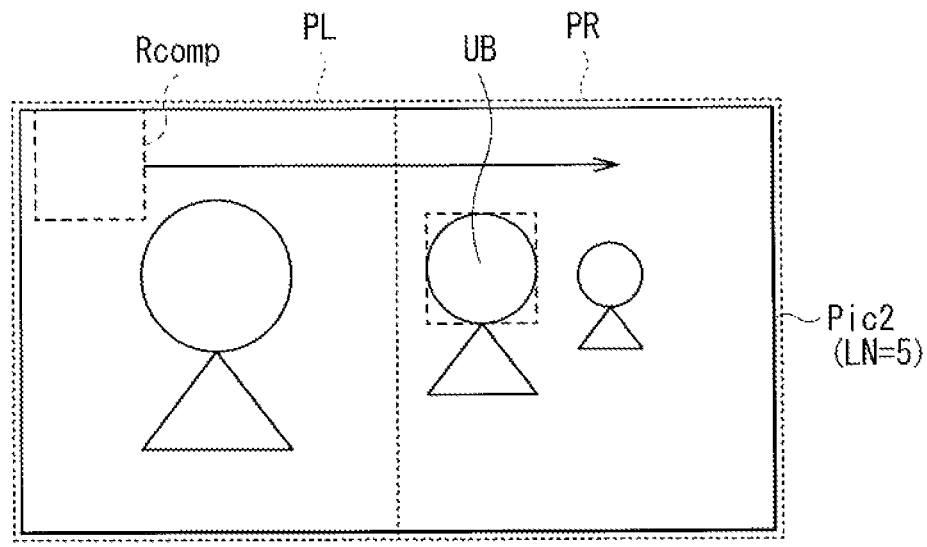
FIGS. 24A and 24B are each another explanatory diagram illustrating the operation example of the face detection section illustrated in FIG. 21.
Figure 24B:
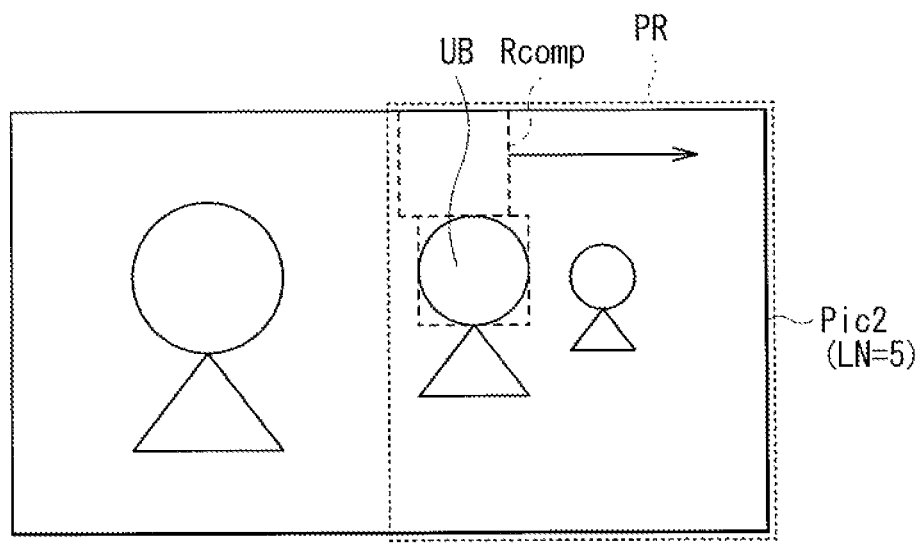

FIGS. 24A and 24B illustrate an operation example of face detection using a photographed image Pict associated with the layer number LN of 5, where FIG. 24A illustrates face detection in the search DL0 and DR0, and FIG. 24B illustrates face detection in the search DR1.

As illustrated in FIG. 23, both the search DL0 and the search DR0 involve face detection for the photographed image Pic2 associated with the layer number LN of 5. Accordingly, in this case, as illustrated in FIG. 24A, the face detection section 40 performs face detection through scanning the entire photographed image Pic2.

On the other hand, for example, as illustrated in FIG. 23, only the search DR1 between the search DL1 and the search DR1 involves face detection for the photographed image Pic2 associated with the layer number LN of 5. Accordingly, in this case, as illustrated in FIG. 24B, the face detection section 40 performs face detection through scanning only the right-half region PR of the photographed image Pic2.

FIG. 25 illustrates an operation example of face detection using a photographed image Pic2 associated with the layer number LN of 7. This operation example shows face detection involved in the search DL1 and DR1. As illustrated in FIG. 23, both the search DL1 and the search DR1 involve face detection for the photographed image Pic2 associated with the layer number LN of 7. Accordingly, in this case, as illustrated in FIG. 25, the face detection section 40 performs face detection through scanning the entire photographed image Pic2. Specifically, in this example, the layer threshold THL1 is 7, and the layer threshold THR1 is 5. Hence, face detection is performed in both the left side and the right side across the blocks corresponding to the layer numbers LN of 7 to 9 which are each equal to or larger than the largest value (7) of the layer thresholds THL1 and THR1. Accordingly, the face detection section 40 performs face detection through scanning the entire photographed image Pic2 across the blocks corresponding to the layer numbers LN of 7 to 9.

In this way, in the case where both left search and corresponding right search involve face detection at a position corresponding to a certain layer number LN, the face detection section 40 performs face detection through scanning the entire photographed image Pic2. In addition, in the case where one of left search and right search involves face detection at a position corresponding to a certain layer number LN, the face detection section 40 performs face detection through scanning only a corresponding region in the photographed image Pic2.

As described above, in the second embodiment, a photographed image is divided into a plurality of regions, and frequency of face detection is set for each of the divided regions. Hence, frequency of face detection is reduced for a region in which no face is expected to be detected, thus achieving a short search time. Other effects are similar to those in the first embodiment.

[Modification 2-1]

For example, the second embodiment may be modified such that a region for face detection is limited by using motion detection. This is described in detail below with an exemplary case.

Figure 26:
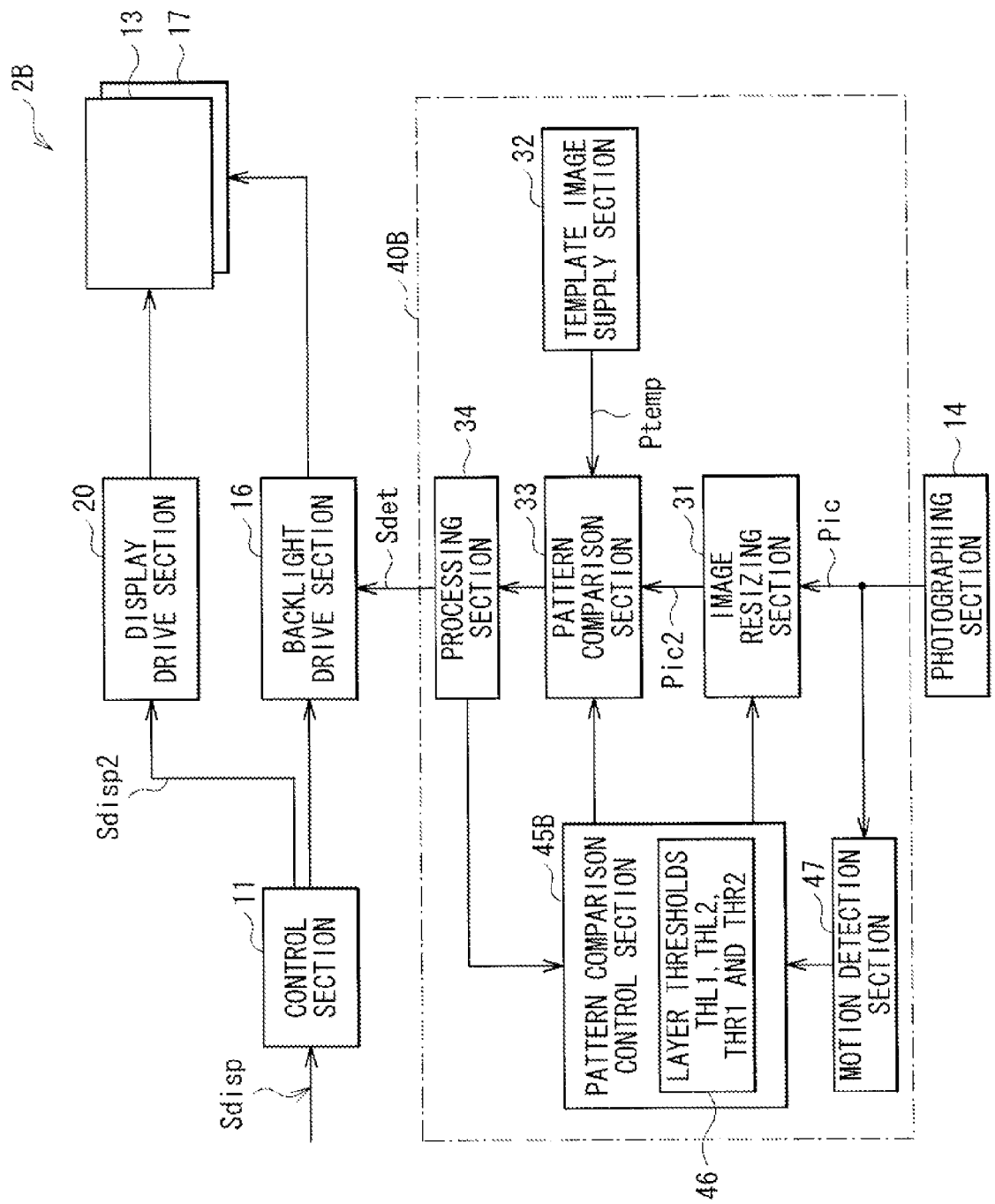
FIG. 26 is a block diagram illustrating an exemplary configuration of a display according to a modification of the second embodiment.

FIG. 26 illustrates an exemplary configuration of a display 2B according to modification 2-1. The display 2B includes a face detection section 40B. The face detection section 40B includes a motion detection section 47 and a pattern comparison control section 45B. The motion detection section 47 performs motion detection using frame difference, based on a series of photographed images Pic. Then, the motion detection section 47 supplies information on a portion in which motion is detected, in each photographed image Pic to the pattern comparison control section 45B. The pattern comparison control section 45B sets the frequency of face detection for individual regions with reference to the information supplied from the motion detection section 47. In detail, for example, a person may not face the display 2B since he/she has just moved to the front of the display 2B, and therefore the pattern comparison section 33 and the like have not recognized his/her face. The motion detection section 47 detects such a person, and supplies information of the person to the pattern comparison control section 45B. In other words, the person may be a viewer of the display 2B soon. For example, the pattern comparison control section 45B sets the layer thresholds THL1, THL2, THR1, and THR2 based on the supplied information such that, when the person faces the display 2B, the face of the person is detected at a high frequency. Consequently, even if a new viewer is added, the display 2B immediately performs face detection for the viewer.

[Modification 2-2]

Although a photographed image Pic is divided into, for example, two, or right and left (horizontal) regions in the second embodiment, this is not limitative. Alternatively, for example, the photographed image Pic may be divided into three or more horizontal regions, or may be divided into two or more vertical (perpendicular) regions. Alternatively, these may be combined so that the photographed image Pic is divided into a matrix.

[Modification 2-3]

For example, the modifications of the first embodiment may be applied to the second embodiment.

While the present technology has been described with the embodiments and the modifications hereinbefore, the technology may be used for various applications. For example, the technology may be used for gamma correction based on a position of a viewer nearest a display. Specifically, for example, different types of gamma correction may be performed between a case of the viewer at the front of the screen of the display and a case of the viewer at a position slightly displaced from the front. Alternatively, sound balance between right and left may be adjusted based on a position of a viewer nearest a display. Alternatively, for example, in the case where a display is a stereoscopic display, parallax between a left-eye image and a right-eye image may be adjusted based on a distance between the display and a viewer. Alternatively, the technology may be used to control the directivity of a microphone to be in a direction toward a speaker in a videoconference system. Specifically, beam forming, which is one of microphone characteristics, is dynamically changed to be in a direction toward a speaker, so that voice of only a desired speaker is captured while surrounding noise is reduced. In addition, the technology may be applied to digital signage. In addition, for example, the various processes in the applications may be performed not only based on the position of a viewer nearest a display, but also based on a position of another viewer.

Although the embodiments and the modifications have been exemplarily described with a display, the present technology is not limited thereto, and the technology may be used for an application where a position of a face is detected, and operation is performed following the position. For example, the technology may be used for applications of an air conditioner, a humidifier, various types of face care products, and the like, where a position of a user face is followed, and air or mist is fed to the position. In addition, although the technology is used for the applications where operation is performed following a position of a user face in the above exemplary case, the technology is not limited thereto, and the technology may be used for an application where operation is performed while a position of a user face is constantly avoided.

In addition, although the face of a viewer has been detected in the embodiments and the modifications, the technology is not limited thereto. For example, a detection section having a configuration similar to that of the face detection section 30 may be mounted in a motor vehicle to detect another vehicle approaching. Consequently, for example, an approaching vehicle is detected in a short process time.

It is to be noted that the technology may be configured as follows.

(1) A photographing system including:
a photographing section photographing a subject to acquire a frame image including a subject image; and
a matching section changing size of one or both of the subject image and a beforehand prepared template image to change a size ratio of the template image to the subject image, and performing pattern matching between the subject image and the template image, size of one or both of the subject image and the template image being changed, for each of size ratios,
wherein the matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and is performed at a frequency lower than the first frequency in a range of a size ratio smaller than the first size ratio.

(2) The photographing system according to (1),
wherein the matching section holds, as a second size ratio, a size ratio having a smallest value among the obtained size ratios in the certain order of image search, and thereafter performs image search in a manner that pattern matching is performed at a second frequency lower than the first frequency in a range of a size ratio smaller than the first size ratio and equal to or larger than the second size ratio, and is performed at a third frequency lower than the second frequency in a range of a size ratio smaller than the second size ratio.

(3) The photographing system according to (1) or (2), wherein the matching section changes the size ratio to be gradually reduced in each piece of image search.

(4) The photographing system according to any one of (1) to (3), wherein if the patterns do not match each other in the range of the size ratio equal to or larger than the first size ratio in any image search after the image search in which the first size ratio is obtained, the matching section performs pattern matching across all size ratios in subsequent image search.

(5) The photographing system according to any one of (1) to (4), wherein the matching section performs pattern matching through scanning the entire area of the frame image while shifting a region as a matching object.

(6) The photographing system according to (2), wherein the frame image is divided into a plurality of regions, and the matching section sets the first size ratio and the second size ratio for each of the divided regions to set frequency of pattern matching for image search.

(7) The photographing system according to (6), wherein the matching section performs pattern matching through scanning the entire area of the frame image while shifting a region as a matching object in a range of a size ratio equal to or larger than a largest value among values of first size ratios in the regions of the frame image.

(8) The photographing system according to (6), further including a motion detection section performing motion detection based on frame difference between the plurality of frame images acquired at time points different from one another, wherein the matching section corrects each of the first and second size ratios for each of the regions of the frame image based on a result of the motion detection.

(9) The photographing system according to (2), wherein the matching section acquires information on a relevant subject, based on the subject image, and corrects each of the first and second size ratios based on the information.

(10) The photographing system according to (2), wherein the first size ratio corresponds to a distance between the photographing section and a subject nearest the photographing section, and the second size ratio corresponds to a distance between the photographing section and a subject most distant from the photographing section.

(11) The photographing system according to any one of (1) to (10), wherein the matching section changes the size ratio by changing size of the frame image.

(12) The photographing system according to any one of (1) to (10), wherein the matching section changes the size ratio by changing size of the template image.

(13) The photographing system according to any one of (1) to (12), wherein the subject is a face.

(14) A pattern detection system including
a matching section changing size of one or both of a frame image including a subject image and a beforehand prepared template image to change a size ratio of the template image to the subject image, and performing pattern matching between the subject image and the template image, size of one or both of the subject image and the template image being changed, for each of size ratios,
wherein the matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and is performed at a frequency lower than the first frequency in a range of a size ratio smaller than the first size ratio.

(15) An electronic unit including a photographing system and a control section performing operation control using the photographing system, the photographing system including:
a photographing section photographing a subject to acquire a frame image including a subject image; and
a matching section changing size of one or both of the subject image and a beforehand prepared template image to change a size ratio of the template image to the subject image, and performing pattern matching between the subject image and the template image, size of one or both of the subject image and the template image being changed, for each of size ratios, wherein the matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and performed at a frequency lower than the first frequency in a range of a size ratio smaller than the first size ratio.

It should be understood by those skilled in the art that various modifications, combinations, sub-combinations and alterations may occur depending on design requirements and other factors insofar as they are within the scope of the appended claims or the equivalents thereof.

What is claimed is:

1. A photographing system comprising:
    a photographing section photographing a subject to acquire a frame image including a subject image; and
    a matching section changing size of one or both of the subject image and a beforehand prepared template image to change a size ratio of the template image to the subject image, and performing pattern matching between the subject image and the template image, size of one or both of the subject image and the template image being changed, for each of size ratios,
    wherein the matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and is performed at a frequency lower than the first frequency in a range of a size ratio smaller than the first size ratio.

2. The photographing system according to claim 1, wherein the matching section holds, as a second size ratio, a size ratio having a smallest value among the obtained size ratios in the certain order of image search, and thereafter performs image search in a manner that pattern matching is performed at a second frequency lower than the first frequency in a range of a size ratio smaller than the first size ratio and equal to or larger than the second size ratio, and is performed at a third frequency lower than the second frequency in a range of a size ratio smaller than the second size ratio.

3. The photographing system according to claim 1, wherein the matching section changes the size ratio to be gradually reduced in each piece of image search.

4. The photographing system according to claim 1, wherein if the patterns do not match each other in the range of the size ratio equal to or larger than the first size ratio in any image search after the image search in which the first size ratio is obtained, the matching section performs pattern matching across all size ratios in subsequent image search.

5. The photographing system according to claim 1, wherein the matching section performs pattern matching through scanning the entire area of the frame image while shifting a region as a matching object.

6. The photographing system according to claim 2, wherein the frame image is divided into a plurality of regions, and the matching section sets the first size ratio and the second size ratio for each of the divided regions to set frequency of pattern matching for image search.

7. The photographing system according to claim 6, wherein the matching section performs pattern matching through scanning the entire area of the frame image while shifting a region as a matching object in a range of a size ratio equal to or larger than a largest value among values of first size ratios in the regions of the frame image.

8. The photographing system according to claim 6, further comprising a motion detection section performing motion detection based on frame difference between the plurality of frame images acquired at time points different from one another, wherein the matching section corrects each of the first and second size ratios for each of the regions of the frame image based on a result of the motion detection.

9. The photographing system according to claim 2, wherein the matching section acquires information on a relevant subject, based on the subject image, and corrects each of the first and second size ratios based on the information.

10. The photographing system according to claim 2, wherein the first size ratio corresponds to a distance between the photographing section and a subject nearest the photographing section, and the second size ratio corresponds to a distance between the photographing section and a subject most distant from the photographing section.

11. The photographing system according to claim 1, wherein the matching section changes the size ratio by changing size of the frame image.

12. The photographing system according to claim 1, wherein the matching section changes the size ratio by changing size of the template image.

13. The photographing system according to claim 1, wherein the subject is a face.

14. A pattern detection system, comprising
    a matching section changing size of one or both of a frame image including a subject image and a beforehand prepared template image to change a size ratio of the template image to the subject image, and performing pattern matching between the subject image and the template image, size of one or both of the subject image and the template image being changed, for each of size ratios,
    wherein the matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and is performed at a frequency lower than the first frequency in a range of a size ratio smaller than the first size ratio.

15. An electronic unit including a photographing system and a control section performing operation control using the photographing system, the photographing system comprising:
    a photographing section photographing a subject to acquire a frame image including a subject image; and
    a matching section changing size of one or both of the subject image and a beforehand prepared template image to change a size ratio of the template image to the subject image, and performing pattern matching between the subject image and the template image, size of one or both of the subject image and the template image being changed, for each of size ratios, wherein the matching section repeats image search through pattern matching while sequentially changing the size ratio, and obtains one or more size ratios at which patterns match each other, in a certain order of image search, and holds, as a first size ratio, a size ratio having a largest value among such obtained size ratios, and thereafter performs image search in a manner that pattern matching is performed at a first frequency in a range of a size ratio equal to or larger than the first size ratio, and performed at a frequency lower than the first frequency in a range of a size ratio smaller than the first size ratio.

* * * * *